(12) United States Patent
Xie

(10) Patent No.: US 12,184,536 B2
(45) Date of Patent: Dec. 31, 2024

(54) PACKET FORWARDING METHOD, FIRST NETWORK DEVICE, AND FIRST DEVICE GROUP

(71) Applicant: Huawei Technologies Co., Ltd., Shenzhen (CN)

(72) Inventor: Jingrong Xie, Beijiing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 17/743,905

(22) Filed: May 13, 2022

(65) Prior Publication Data
US 2022/0272028 A1    Aug. 25, 2022

Related U.S. Application Data

(63) Continuation of application No. PCT/CN2020/117008, filed on Sep. 23, 2020.

(30) Foreign Application Priority Data

Nov. 15, 2019  (CN) .......................... 201911115998.9
Feb. 11, 2020  (CN) .......................... 202010086666.9

(51) Int. Cl.
*H04L 12/18*     (2006.01)
*H04L 45/00*     (2022.01)
(Continued)

(52) U.S. Cl.
CPC ............ *H04L 45/16* (2013.01); *H04L 12/185* (2013.01); *H04L 12/1863* (2013.01);
(Continued)

(58) Field of Classification Search
CPC . H04L 12/18–1895; H04L 41/02–5096; H04L 43/02–55; H04L 45/02–851;
(Continued)

(56) References Cited

U.S. PATENT DOCUMENTS 9,806,895 B1    10/2017  Kommula et al.
2006/0221975 A1  10/2006  Lo et al.
(Continued)

FOREIGN PATENT DOCUMENTS

CN     1933448 A     3/2007
CN     1946040 A     4/2007
(Continued)

OTHER PUBLICATIONS

T. Morin, Ed. et al, "Multicast VPN fast upstream failover," draft-ietf-bess-mvpn-fast-failover-08, Aug. 28, 2019, 21 pages.
(Continued)

*Primary Examiner* — Timothy J Weidner
(74) *Attorney, Agent, or Firm* — Conley Rose, P.C.

(57) ABSTRACT

A packet forwarding method includes that a first network device receives a multicast packet from a multicast source device and forwarded by a device group, where the device group includes a second network device and a third network device, and the multicast packet is forwarded to the first network device by one network device in the device group. The first network device determines, according to a reverse-path forwarding (RPF) entry, that the multicast packet is forwarded by the device group, where the RPF entry includes a first sub-entry instructing the first network device to forward the multicast packet sent by the second network device and a second sub-entry instructing the first network device to forward the multicast packet sent by the third network device. The first network device sends the multicast packet to a multicast destination device according to the RPF entry.

30 Claims, 9 Drawing Sheets

(51) Int. Cl.
*H04L 45/12* (2022.01)
*H04L 45/16* (2022.01)
*H04L 45/24* (2022.01)
*H04L 45/28* (2022.01)
*H04L 45/74* (2022.01)
*H04L 47/10* (2022.01)
*H04L 47/80* (2022.01)
*H04L 69/14* (2022.01)
*H04L 69/40* (2022.01)

(52) U.S. Cl.
CPC ............ *H04L 45/123* (2013.01); *H04L 45/24* (2013.01); *H04L 45/28* (2013.01); *H04L 45/54* (2013.01); *H04L 45/74* (2013.01); *H04L 47/15* (2013.01); *H04L 47/806* (2013.01); *H04L 69/14* (2013.01); *H04L 69/40* (2013.01)

(58) Field of Classification Search
CPC ..... H04L 47/10–83; H04L 49/10–9094; H04L 69/02–40; H04L 2101/659; H04L 2212/00
See application file for complete search history.

(56) References Cited

U.S. PATENT DOCUMENTS

| | | | |
|---|---|---|---|
| 2007/0153791 | A1 | 7/2007 | Zheng et al. |
| 2008/0259784 | A1 | 10/2008 | Allan et al. |
| 2009/0201803 | A1* | 8/2009 | Filsfils .................... H04L 45/16 |
| 2010/0061230 | A1 | 3/2010 | Xiong et al. |
| 2012/0099422 | A1 | 4/2012 | Liu et al. |
| 2013/0034097 | A1 | 2/2013 | Dharmapurikar et al. |
| 2014/0016457 | A1 | 1/2014 | Enyedi et al. |
| 2014/0226464 | A1 | 8/2014 | Kumar et al. |
| 2017/0126587 | A1 | 5/2017 | Ranns et al. |
| 2019/0036717 | A1 | 1/2019 | Kebler et al. |
| 2021/0351947 | A1* | 11/2021 | Liu ........................ H04L 45/16 |

FOREIGN PATENT DOCUMENTS

| | | |
|---|---|---|
| CN | 1992707 A | 7/2007 |
| CN | 101043422 A | 9/2007 |
| CN | 101094175 A | 12/2007 |
| CN | 102111342 A | 6/2011 |
| CN | 103460647 A | 12/2013 |
| CN | 103703455 A | 4/2014 |
| CN | 102742221 B | 7/2015 |
| CN | 104901893 A | 9/2015 |
| CN | 105337746 A | 2/2016 |
| CN | 108234358 A | 6/2018 |
| CN | 109218178 A | 1/2019 |
| CN | 109743250 A | 5/2019 |
| CN | 109787839 A | 5/2019 |
| CN | 109981308 A | 7/2019 |
| JP | 2004023179 A | 1/2004 |
| JP | 2012054861 A | 3/2012 |
| JP | 2012529198 A | 11/2012 |
| JP | 2013118537 A | 6/2013 |
| JP | 2014036430 A | 2/2014 |
| WO | 2005101759 A1 | 10/2005 |
| WO | 2011144048 A2 | 11/2011 |
| WO | 2012075831 A1 | 6/2012 |
| WO | 2019075674 A1 | 4/2019 |

OTHER PUBLICATIONS

RFC 4601, B. Fenner et al, "Protocol Independent Multicast—Sparse Mode (PIM-SM): Protocol Specification (Revised)," Aug. 2006, 112 pages.
RFC 6513, E. Rosen, Ed. et al, "Multicast in MPLS/BGP IP VPNs, Internet Engineering Task Force (IETF)," Feb. 2012, 88 pages.
RFC 6514, R. Aggarwal et al, "BGP Encodings and Procedures for Multicast in MPLS/BGP IP VPNs," Feb. 2012, 59 pages.
A Karan et al., "Multicast only Fast Re-Route," draft-karan-mofrr-01.txt, Mar. 13, 2011, 14 pages.
Zan, OpenFlow-based Fast Switching Mechanism for Multicast Applications, DOI:10.16707/j.cnki.fjpc.2016.09.046, Sep. 2016, with an English translation, 11 pages.

* cited by examiner

PACKET FORWARDING METHOD, FIRST NETWORK DEVICE, AND FIRST DEVICE GROUP

CROSS-REFERENCE TO RELATED APPLICATIONS

This is a continuation of International Patent Application No. PCT/CN2020/117008 filed on Sep. 23, 2020, which claims priority to Chinese Patent Application No. 201911115998.9 filed on Nov. 15, 2019 and claims priority to Chinese Patent Application No. 202010086666.9 filed on Feb. 11, 2020. All of the aforementioned patent applications are hereby incorporated by reference in their entireties.

TECHNICAL FIELD

This application relates to the network communications field, and in particular, to a packet forwarding method, a first network device, and a first device group.

BACKGROUND

Multicast is a data transmission mode in which data is efficiently sent to a plurality of receivers in a Transmission Control Protocol (TCP)/Internet Protocol (IP) network at a same time by using one multicast address.

A multicast receiver may send a multicast joining message to a network device, and the network device may send the multicast joining message to a multicast source by using a router connected to the network device. The multicast source sends multicast traffic to the network device by using a router connected to the multicast source, and forwards the multicast traffic to the multicast receiver by using the network device. In the conventional technical solution, when a communication link between the multicast source and the router connected to the multicast source fails, the network device connected to the multicast receiver needs to send the multicast joining message to another router. This results in a long service recovery time.

SUMMARY

This application provides a packet forwarding method, to shorten a service recovery time when any network device in a first device group fails or a link corresponding to the network device fails.

According to a first aspect, a packet forwarding method is provided. The method includes that a first network device receives a first multicast packet sent by a multicast source device and forwarded by a first device group, where the first device group includes a second network device and a third network device, and the first multicast packet is forwarded to the first network device by one network device in the first device group. The first network device determines, according to a reverse-path forwarding (RPF) entry, that the first multicast packet is a multicast packet forwarded by the first device group, where the RPF entry includes a first sub-entry and a second sub-entry, the first sub-entry indicates the first network device to forward the first multicast packet sent by the second network device, and the second sub-entry indicates the first network device to forward the first multicast packet sent by the third network device. The first network device sends the first multicast packet to a multicast destination device according to the RPF entry.

In the technical solution, the network device may forward, according to the RPF entry, the multicast packet sent by any device in the first device group. When one network device in the first device group fails or a link corresponding to the network device fails, the network device may forward, according to the RPF entry, the multicast packet delivered by another network device corresponding to a normal link in the first device group. This shortens a service recovery time when one network device in the device group that forwards the multicast packet fails or a link corresponding to the network device fails.

In a possible implementation, when a first communication link is in a normal state, the first network device sends the first multicast packet to the multicast destination device according to the first sub-entry.

The first communication link is a communication link from the multicast source device to the second network device and then to the first network device.

In another possible implementation, when a second communication link is in a normal state, the first network device receives the first multicast packet forwarded through the first communication link, where a metric of the first communication link is less than a metric of the second communication link.

A metric of a link in this application may be quality of the link, bandwidth of the link, or the like. The second communication link is a communication link from the multicast source device to the third network device and then to the first network device.

In another possible implementation, when a metric of a link from the multicast source to the second network device is less than a metric of a link from the multicast source to the third network device, the second network device forwards, to the first network device, the first multicast packet sent by the multicast source.

In another possible implementation, when a priority of the first communication link is higher than a priority of the second communication link, the second network device forwards, to the first network device, the first multicast packet sent by the multicast source.

In another possible implementation, when a first communication link is in a fault state, and a second communication link is in a normal state, the first network device sends the first multicast packet to the multicast destination device according to the second sub-entry.

In another possible implementation, before the first network device determines, according to the RPF entry, that the first multicast packet is the multicast packet forwarded by the first device group, the method further includes that the first network device receives first control information sent by the second network device, where the first control information includes a second identifier, and the second identifier is an identifier of the second network device. The first network device generates the first sub-entry based on the second identifier, where the first sub-entry is a correspondence between the second identifier and a multicast source group (S, G) corresponding to the first multicast packet.

The first network device receives second control information sent by the third network device, where the second control information includes a third identifier, and the third identifier is an identifier of the third network device. The first network device generates the second sub-entry based on the third identifier, where the second sub-entry is a correspondence between the third identifier and the multicast source group (S, G) corresponding to the first multicast packet.

In another possible implementation, the second identifier and the third identifier are IP addresses or IP version 6 (IPv6) addresses.

In another possible implementation, the first control information further includes a first device group identifier. The second control information further includes the first device group identifier. The first device group identifier is an identifier of the first device group. The method further includes that the first network device determines the RPF entry based on the first device group identifier.

Further, the first network device determines the first sub-entry and the second sub-entry as the RPF entry based on the first device group identifier.

In another possible implementation, the first device group identifier is an IP address, an IPv6 address, or an integer.

In another possible implementation, the first device group identifier may be a same IP address or an anycast IP address configured on the second network device and the third network device.

In another possible implementation, before the second network device sends a first control message to the first network device or the third network device sends a second control message to the first network device, the method further includes that the first device group identifier is configured on the second network device and the third network device in the first device group.

According to a second aspect, a packet forwarding method is provided. The method includes that a second network device in a first device group sends a second identifier and a first device group identifier to a first network device, where the first device group includes the second network device and a third network device, the second identifier is an identifier of the second network device, and the first device group identifier is an identifier of the first device group. The third network device in the first device group sends a third identifier and the first device group identifier to the first network device.

The third identifier is an identifier of the third network device, the second identifier, the third identifier, and the first device group identifier are used to trigger the first network device to generate an RPF entry based on the second identifier, the third identifier, and the first device group identifier, the RPF entry includes a first sub-entry and a second sub-entry, the first sub-entry indicates the first network device to forward a first multicast packet sent by the second network device in the first device group, and the second sub-entry indicates the first network device to forward the first multicast packet sent by the third network device in the first device group.

In a possible implementation, the method further includes that a network device in the first device group receives the first multicast packet sent by a multicast source device. The network device in the first device group forwards the first multicast packet to the first network device.

In another possible implementation, the network device in the first device group receives a unicast packet sent by the multicast source, where the first multicast packet is encapsulated in the unicast packet.

In another possible implementation, a destination address of the unicast packet is the first device group identifier or an anycast IP address, or may be an integer.

In another possible implementation, a first communication link is in a normal state. The first communication link is a communication link from the multicast source device to the second network device and then to the first network device. The second network device in the first device group forwards, to the first network device, the first multicast packet received from the multicast source device.

In another possible implementation, a second communication link is in a normal state. The second communication link is a communication link from the multicast source device to the third network device and then to the first network device. A metric of the first communication link is less than a metric of the second communication link.

In another possible implementation, when a metric of a link from the multicast source to the second network device is less than a metric of a link from the multicast source to the third network device, the second network device forwards, to the first network device, the first multicast packet sent by the multicast source.

In another possible implementation, when a priority of the first communication link is higher than a priority of the second communication link, the second network device forwards, to the first network device, the first multicast packet sent by the multicast source.

In another possible implementation, when a first communication link is in a fault state, and a second communication link is in a normal state, the third network device in the first device group forwards, to the first network device, the first multicast packet received from the multicast source device.

In another possible implementation, the first device group identifier is an IP address, an IPv6 address, or an integer.

In another possible implementation, the first device group identifier may be a same IP address or an anycast IP address configured on the second network device and the third network device.

In another possible implementation, before the second network device sends a first control message to the first network device or the third network device sends a second control message to the first network device, the method further includes that the first device group identifier is configured on the second network device and the third network device in the first device group.

Beneficial effects of the second aspect and any possible implementation of the second aspect correspond to beneficial effects of the first aspect and any possible implementation of the first aspect. Details are not described herein again.

According to a third aspect, a first network device is provided. The first network device includes that a receiving module configured to receive a first multicast packet sent by a multicast source device and forwarded by a first device group, where the first device group includes a second network device and a third network device, and the first multicast packet is forwarded to the first network device by one network device in the first multicast group, a determining module configured to determine, according to a RPF entry, that the first multicast packet is a multicast packet forwarded by the first device group, where the RPF entry includes a first sub-entry and a second sub-entry, the first sub-entry indicates the first network device to forward the first multicast packet sent by the second network device, and the second sub-entry indicates the first network device to forward the first multicast packet sent by the third network device, and a sending module configured to send the first multicast packet to a multicast destination device according to the RPF entry.

In a possible implementation, a first communication link is in a normal state. The first communication link is a communication link from the multicast source device to the second network device and then to the first network device. The sending module is further configured to send the first multicast packet to the multicast destination device according to the first sub-entry.

In another possible implementation, a second communication link is in a normal state. The second communication link is a communication link from the multicast source device to the third network device and then to the first network device. The receiving module is further configured to receive the first multicast packet forwarded through the first communication link. A metric of the first communication link is less than a metric of the second communication link.

In another possible implementation, when a metric of a link from the multicast source to the second network device is less than a metric of a link from the multicast source to the third network device, the second network device forwards, to the first network device, the first multicast packet sent by the multicast source.

In another possible implementation, when a priority of the first communication link is higher than a priority of the second communication link, the second network device forwards, to the first network device, the first multicast packet sent by the multicast source.

In another possible implementation, when a first communication link is in a fault state, and a second communication link is in a normal state, the sending module is further configured to send the first multicast packet to the multicast destination device according to the second sub-entry.

In another possible implementation, the receiving module is further configured to receive first control information sent by the second network device, where the first control information includes a second identifier, and the second identifier is an identifier of the second network device. The first network device further includes a generation module configured to generate the first sub-entry based on the second identifier, where the first sub-entry is a correspondence between the second identifier and a multicast source group (S, G) corresponding to the first multicast packet. The receiving module is further configured to receive second control information sent by the third network device, where the second control information includes a third identifier, and the third identifier is an identifier of the third network device. The generation module is further configured to generate the second sub-entry based on the third identifier, where the second sub-entry is a correspondence between the third identifier and the multicast source group (S, G) corresponding to the first multicast packet.

In another possible implementation, the second identifier and the third identifier are IP addresses or IPv6 addresses.

In another possible implementation, the first control information further includes a first device group identifier. The second control information further includes the first device group identifier. The first device group identifier is an identifier of the first device group. The determining module is further configured to determine the RPF entry based on the first device group identifier.

In another possible implementation, the first device group identifier is an IP address, an IPv6 address, or an integer.

In another possible implementation, the first device group identifier may be a same IP address or an anycast IP address configured on the second network device and the third network device.

In another possible implementation, before the second network device sends a first control message to the first network device or the third network device sends a second control message to the first network device, the method further includes that the first device group identifier is configured on the second network device and the third network device in the first device group.

According to a fourth aspect, a first device group is provided. The first device group includes a second network device and a third network device. The first device group includes that a sending module configured to send, by using the second network device in the first device group, a second identifier and a first device group identifier to a first network device, where the first device group includes the second network device and the third network device, the second identifier is an identifier of the second network device, and the first device group identifier is an identifier of the first device group, where the sending module is further configured to send, by using the third network device in the first device group, a third identifier and the first device group identifier to the first network device, where the third identifier is an identifier of the third network device, the second identifier, the third identifier, and the first device group identifier are used to trigger the first network device to generate a RPF entry based on the second identifier, the third identifier, and the first device group identifier, the RPF entry includes a first sub-entry and a second sub-entry, the first sub-entry indicates the first network device to forward a first multicast packet sent by the second network device in the first device group, and the second sub-entry indicates the first network device to forward the first multicast packet sent by the third network device in the first device group.

In a possible implementation, the first device group further includes that a receiving module configured to receive, by using a network device in the first device group, the first multicast packet sent by a multicast source device, and the sending module is further configured to forward, by using the network device in the first device group, the first multicast packet to the first network device.

In another possible implementation, the sending module is further configured to receive, by using the network device in the first device group, a unicast packet sent by the multicast source, where the first multicast packet is encapsulated in the unicast packet.

In another possible implementation, a destination address of the unicast packet is the first device group identifier or an anycast IP address, or may be an integer.

In another possible implementation, a first communication link is in a normal state. The first communication link is a communication link from the multicast source device to the second network device and then to the first network device. The sending module is further configured to forward, by using the second network device in the first device group, the first multicast packet received from the multicast source device to the first network device.

In another possible implementation, a second communication link is in a normal state. The second communication link is a communication link from the multicast source device to the third network device and then to the first network device. A metric of the first communication link is less than a metric of the second communication link.

In another possible implementation, when a metric of a link from the multicast source to the second network device is less than a metric of a link from the multicast source to the third network device, the second network device forwards, to the first network device, the first multicast packet sent by the multicast source.

In another possible implementation, when a priority of the first communication link is higher than a priority of the second communication link, the second network device forwards, to the first network device, the first multicast packet sent by the multicast source.

In another possible implementation, when a first communication link is in a fault state, and a second communication link is in a normal state, the sending module is further configured to forward, by using the third network device in the first device group, the first multicast packet received from the multicast source device to the first network device.

In another possible implementation, the first device group identifier is an IP address, an IPv6 address, or an integer.

In another possible implementation, the first device group identifier may be a same IP address or an anycast IP address configured on the second network device and the third network device.

In another possible implementation, before the second network device sends a first control message to the first network device or the third network device sends a second control message to the first network device, the method further includes that the first device group identifier is configured on the second network device and the third network device in the first device group.

According to a fifth aspect, a first network device is provided. The first network device includes a processor, a memory, an interface, and a bus. The interface may be implemented in a wireless or wired manner, and may be further a network adapter. The processor, the memory, and the interface are connected through the bus.

The interface may further include a transmitter and a receiver, and is configured for the first network device to implement the foregoing receiving and sending. For example, the interface is configured to support receiving a first multicast packet sent by a multicast source device and forwarded by a first device group. For another example, the interface is configured to support sending the first multicast packet to a multicast destination device according to an RPF entry. For another example, the interface is configured to support sending the first multicast packet to the multicast destination device according to a second sub-entry.

The processor is configured to perform processing performed by the first network device in the foregoing embodiment. For example, the processor is configured to determine, according to an RPF entry, that the first multicast packet is a multicast packet forwarded by the first device group, generate the first sub-entry based on the second identifier, generate the second sub-entry based on the third identifier, and/or perform other processes for the techniques described herein. The memory includes an operating system and an application, and is configured to store a program, code, or an instruction. When executing the program, the code, or the instruction, the processor or a hardware device may complete a processing process of the first network device in the method embodiment. Optionally, the memory may include a read-only memory (ROM) and a random-access memory (RAM). The ROM includes a basic input/output system (BIOS) or an embedded system, and the RAM includes an application and an operating system. When the first network device needs to run, a bootloader in the BIOS or the embedded system that is built into the ROM is used to boot a system to start, and boot the first network device to enter a normal running state. After entering the normal running state, the first network device runs the application and the operating system in the RAM, to complete the processing processes of the first network device in the method embodiment.

It may be understood that, in actual application, the first network device may include any quantity of interfaces, processors, or memories.

According to a sixth aspect, a computer-readable medium is provided. The computer-readable medium stores program code. When the computer program code is run on a computer, the computer is enabled to perform the method according to any one of the first aspect or the possible implementations of the first aspect. The computer-readable storage includes but is not limited to one or more of the following: a ROM, a programmable ROM (PROM), an erasable PROM (EPROM), a flash memory, an electrically EPROM (EEPROM), and a hard drive.

According to a seventh aspect, a computer-readable medium is provided. The computer-readable medium stores program code. When the computer program code is run on a computer, the computer is enabled to perform the method according to any one of the second aspect or the possible implementations of the second aspect. The computer-readable storage includes but is not limited to one or more of the following: a ROM, a PROM, an EPROM, a flash memory, an EEPROM, and a hard drive.

According to an eighth aspect, a computer program product is provided. The computer program product includes computer program code. When the computer program code is run on a computer, the computer is enabled to perform the method according to any one of the first aspect or the possible implementations of the first aspect.

According to a ninth aspect, a computer program product is provided. The computer program product includes computer program code. When the computer program code is run on a computer, the computer is enabled to perform the method according to any one of the first aspect or the possible implementations of the first aspect.

According to a tenth aspect, a chip is provided. The chip includes a processor and a data interface. The processor reads, by using the data interface, instructions stored in a memory, to perform the method according to any one of the first aspect or the possible implementations of the first aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field-programmable gate array (FPGA), or a programmable logic device (PLD).

According to an eleventh aspect, a chip is provided. The chip includes a processor and a data interface. The processor reads, by using the data interface, instructions stored in a memory, to perform the method according to any one of the second aspect or the possible implementations of the second aspect. In a specific implementation process, the chip may be implemented in a form of a CPU, a MCU, a MPU, a DSP, an SoC, an ASIC, an FPGA, or a PLD.

According to a twelfth aspect, a system is provided. The system includes the first network device and the first device group.

DESCRIPTION OF EMBODIMENTS

The following describes technical solutions of this application with reference to accompanying drawings.

Multicast is a data transmission mode in which data is efficiently sent to a plurality of receivers in a TCP/IP network at a same time by using one multicast address. A multicast source sends multicast traffic to a multicast group member in a multicast group through a link in a network, and each multicast group member in the multicast group can receive the multicast traffic. A multicast transmission mode implements a point-to-multipoint data connection between the multicast source and the multicast group members. The multicast traffic needs to be transmitted only once on each network link, and the multicast traffic is replicated only when there is a branch on the link. Therefore, the multicast transmission mode improves data transmission efficiency and reduces a possibility of congestion on a backbone network.

Figure 1:
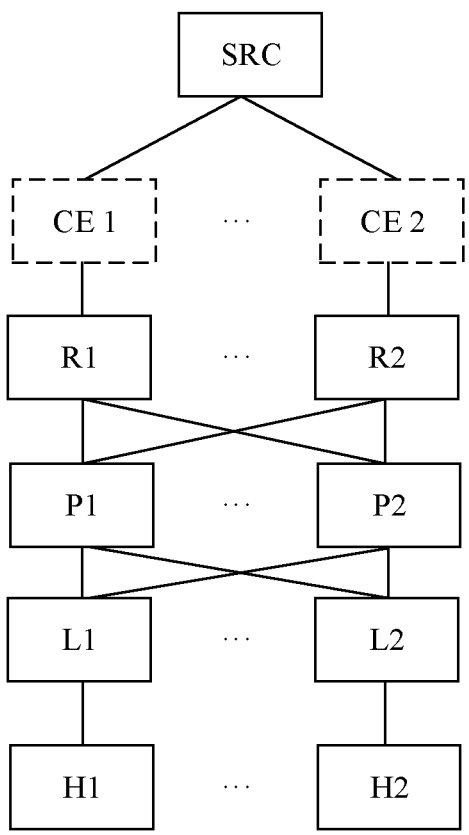
FIG. 1 is a schematic diagram of a possible application scenario to which this application is applied.
Figure 2:
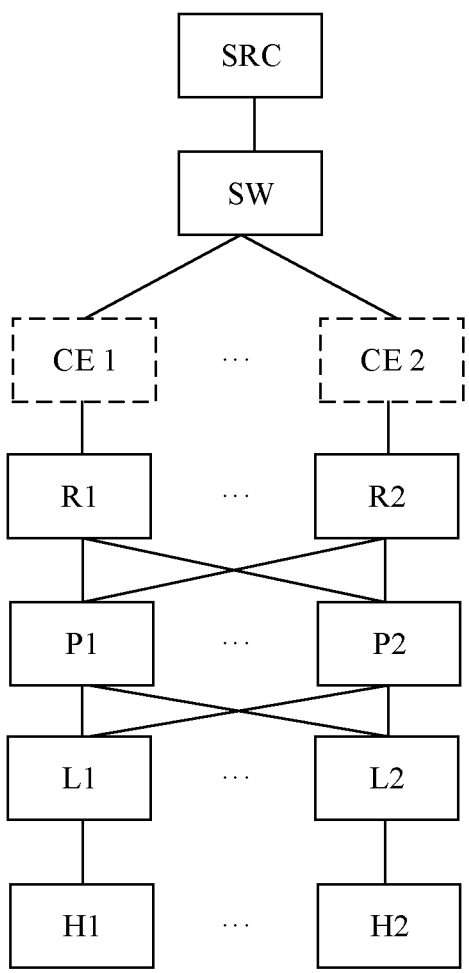
FIG. 2 is a schematic diagram of another possible application scenario to which this application is applied.

For ease of description, the following describes in detail, with reference to FIG. 1 and FIG. 2, application scenarios to which embodiments of this application are applied.

FIG. 1 is a schematic diagram of a possible multicast scenario to which an embodiment of this application is applied. As shown in FIG. 1, the scenario may include a multicast receiver (RCV) and a multicast source (SRC).

In a possible implementation, the multicast source may be directly connected to at least two routers (Rs), which may be referred to as dual homing of the multicast source to the at least two routers. The multicast source may be directly connected to two routers, or may be directly connected to three or more routers. This is not further limited in this application.

In another possible implementation, optionally, a customer edge (CE) switch may be included in FIG. 1, and the multicast source may be separately connected to the at least two routers by using at least two CE switches.

For ease of description, two routers (for example, an R1 and an R2) are used as an example for description in FIG. 1.

FIG. 2 is a schematic diagram of another possible multicast scenario provided in an embodiment of this application. As shown in FIG. 2, a multicast source is separately connected to at least two routers by using a switch (SW), a CE 1, and a CE 2 in this scenario.

Two routers (for example, an R1 and an R2) are used as an example in FIG. 2. The multicast source is connected to the R1 by using the SW and the CE 1, and is connected to the R2 by using the SW and the CE 2.

In this embodiment of this application, a multicast receiver may also be referred to as a multicast destination device, and there may be a plurality of multicast receivers. For ease of description, there are two multicast receivers in the scenario in FIG. 1 or FIG. 2, for example, an H1 and an H2. The H1/H2 are connected to the routers L1/L2 respectively, and the routers L1/L2 are connected to the R1 and the R2 respectively by using P1/P2.

A network including the R1/R2, the P1/P2, and the L1/L2 may also be referred to as a core network, for example, a network provided by an operator. The network is not limited in this embodiment of this application, and may be a multicast virtual private network (MVPN), or may be an Ethernet virtual private network (EVPN). Interfaces used to connect the L1/L2 to the H1/H2 and interfaces used to connect the R1/R2 to the multicast source are user-side interfaces (or private network-side interfaces or private network interfaces) in the network. Interfaces used to connect the R1/R2 to the P1/P2 and interfaces used to connect the L1/L2 to the P1/P2 are network-side interfaces (or public network-side interfaces or public network interfaces) in the network.

The multicast receiver (for example, the H1/H2) may send a multicast joining message to the L1/L2 connected to the multicast receiver. The multicast joining message is not limited in this application, and may be an Internet Group Management Protocol (IGMP) message, or may be a Multicast Listener Discovery (MLD) message. After receiving the multicast message, the L1/L2 may send the multicast joining message to the R1/R2 at a multicast source side by using a Border Gateway Protocol (BGP) message. The BGP message may be a BGP MVPN route message or a BGP EVPN route message. For example, the BGP MVPN route message may be a C-multicast route message or a leaf A-D route message. After receiving the multicast joining message, the multicast source may send a multicast packet to the multicast receiver.

It should be understood that, in this application, the multicast joining message sent by the multicast receiver may include S1G1, where S1 indicates a multicast source (S) for a requested multicast packet, and G1 indicates a multicast group (G) for the requested multicast packet. After receiving the multicast joining message, the multicast source may send the multicast packet to the multicast receiver based on the S1G1 in the multicast packet in the multicast joining message.

In the conventional technical solution, an L1 is used as an example. After receiving S1G1-related multicast joining from an H1, the L1 sends the multicast joining message to an R1, and sends multicast joining carrying "backup" indication information to an R2. After the R1 and the R2 receive a multicast packet from the multicast source, the R1 forwards the multicast packet to the L1. When the R1 fails, the L1 sends, to the R2, multicast joining that does not carry the "backup" indication information, so that the R2 forwards the multicast packet to the L1. In this solution, when the R1 fails, the L1 still needs to send the multicast joining message to the R2. This results in a long service recovery time.

The embodiments of this application provide a packet forwarding method, to shorten a service recovery time when a network device in a device group that forwards a multicast packet fails. The following describes the packet forwarding method in detail with reference to FIG. 3.

Figure 3:
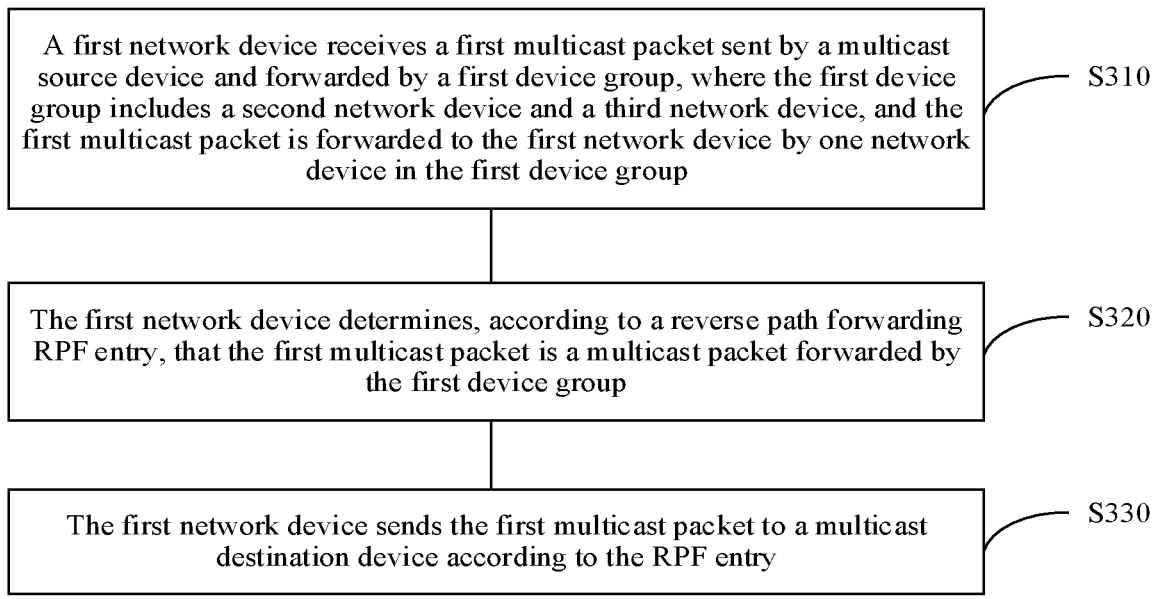
FIG. 3 is a schematic flowchart of a packet forwarding method according to an embodiment of this application.

FIG. 3 is a schematic flowchart of a packet forwarding method according to an embodiment of this application. As shown in FIG. 3, the method may include steps 310 to 330. The following separately describes steps 310 to 330 in detail.

Step 310: A first network device receives a first multicast packet sent by a multicast source device and forwarded by a first device group, where the first device group includes a second network device and a third network device, and the first multicast packet is forwarded to the first network device by one network device in the first multicast group.

In this embodiment of this application, the first network device corresponds to the L1/L2 in FIG. 1, and the second network device and the third network device correspond to the R1 and the R2 respectively. The L1/L2 may receive the first multicast packet sent by the multicast source device and sent by using any network device of the R1/R2.

Step 320: The first network device determines, according to an RPF entry, that the first multicast packet is a multicast packet forwarded by the first device group.

It should be understood that RPF is a technology for preventing a plurality of times of forwarding a multicast data packet. A network device may forward, according to an RPF entry, a multicast packet received from an upstream multicast hop (UMH).

In this embodiment of this application, the RPF entry includes a first sub-entry and a second sub-entry. The first sub-entry indicates the first network device to forward the first multicast packet sent by the second network device. The second sub-entry indicates the first network device to forward the first multicast packet sent by the third network device.

Step 330: The first network device sends the first multicast packet to a multicast destination device according to the RPF entry.

The first network device may forward, according to the RPF entry, the multicast packet sent by using any device in the first device group.

In the technical solution, the network device may forward, according to the RPF entry, the multicast packet sent by any device in the first device group. When one network device in the first device group fails or a link corresponding to the network device fails, the network device may forward, according to the RPF entry, the multicast packet delivered by another network device corresponding to a normal link in the first device group. This shortens a service recovery time when one network device in the device group that forwards the multicast packet fails.

The RPF entry is not limited in this embodiment of this application. In a possible implementation, the first sub-entry in the RPF entry may be a correspondence between an identifier of the second network device (for example, an IP address of the second network device) and a multicast source group (S, G) corresponding to the first multicast packet. The second sub-entry in the RPF entry may be a correspondence between an identifier of the third network device (for example, an IP address of the third network device) and the multicast source group (S, G) corresponding to the first multicast packet. In another possible implementation, the RPF entry may further be a correspondence between an identifier of the first device group and the multicast source group (S, G) corresponding to the first multicast packet, a correspondence (the first sub-entry) between the identifier of the second network device and the identifier of the first device group, and a correspondence (the second sub-entry) between the identifier of the third network device and the identifier of the first device group. The first device group includes the second network device and the third network device.

Figure 4A:
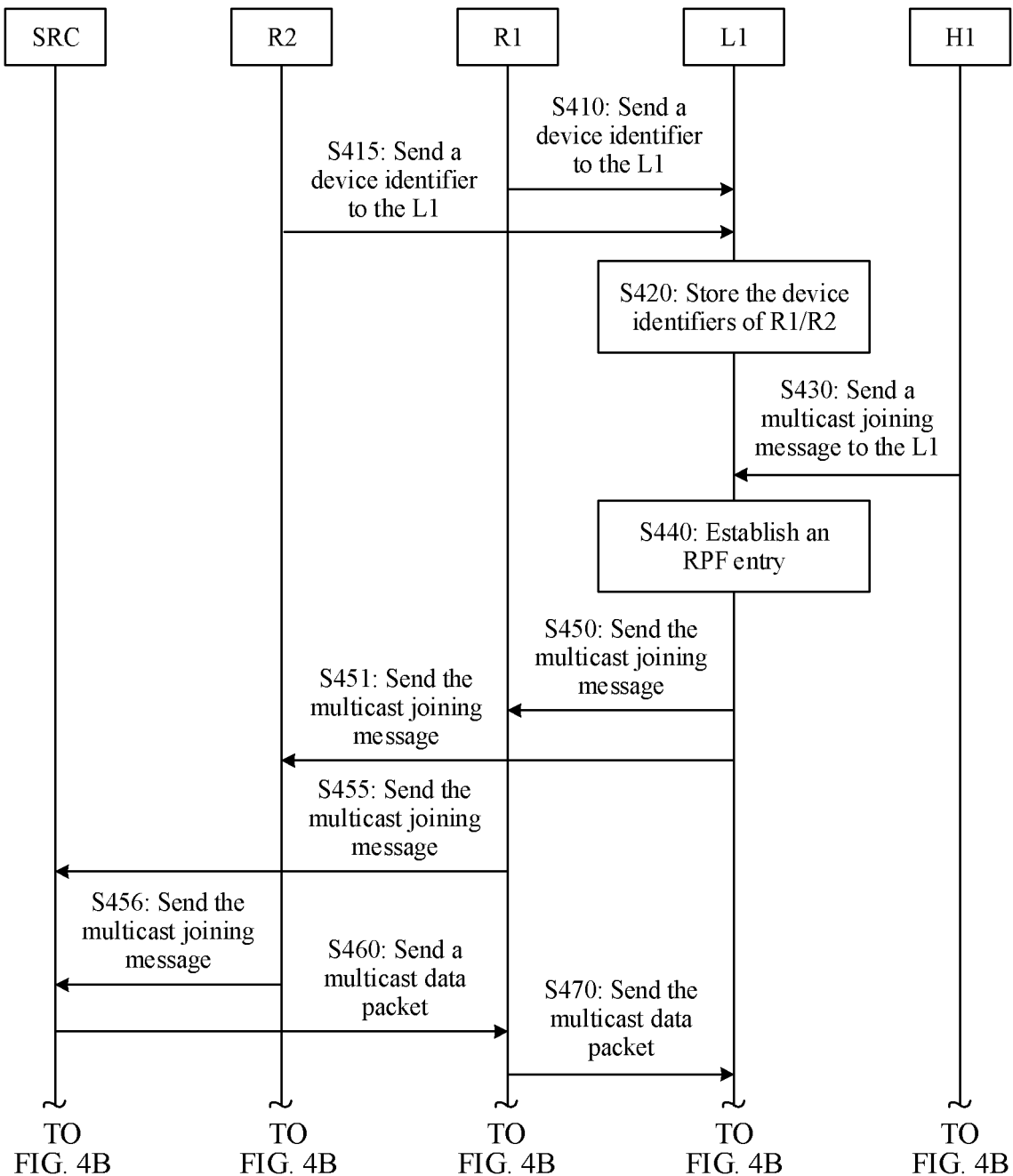
FIG. 4A and FIG. 4B are a schematic flowchart of another packet forwarding method according to an embodiment of this application.
Figure 4B:
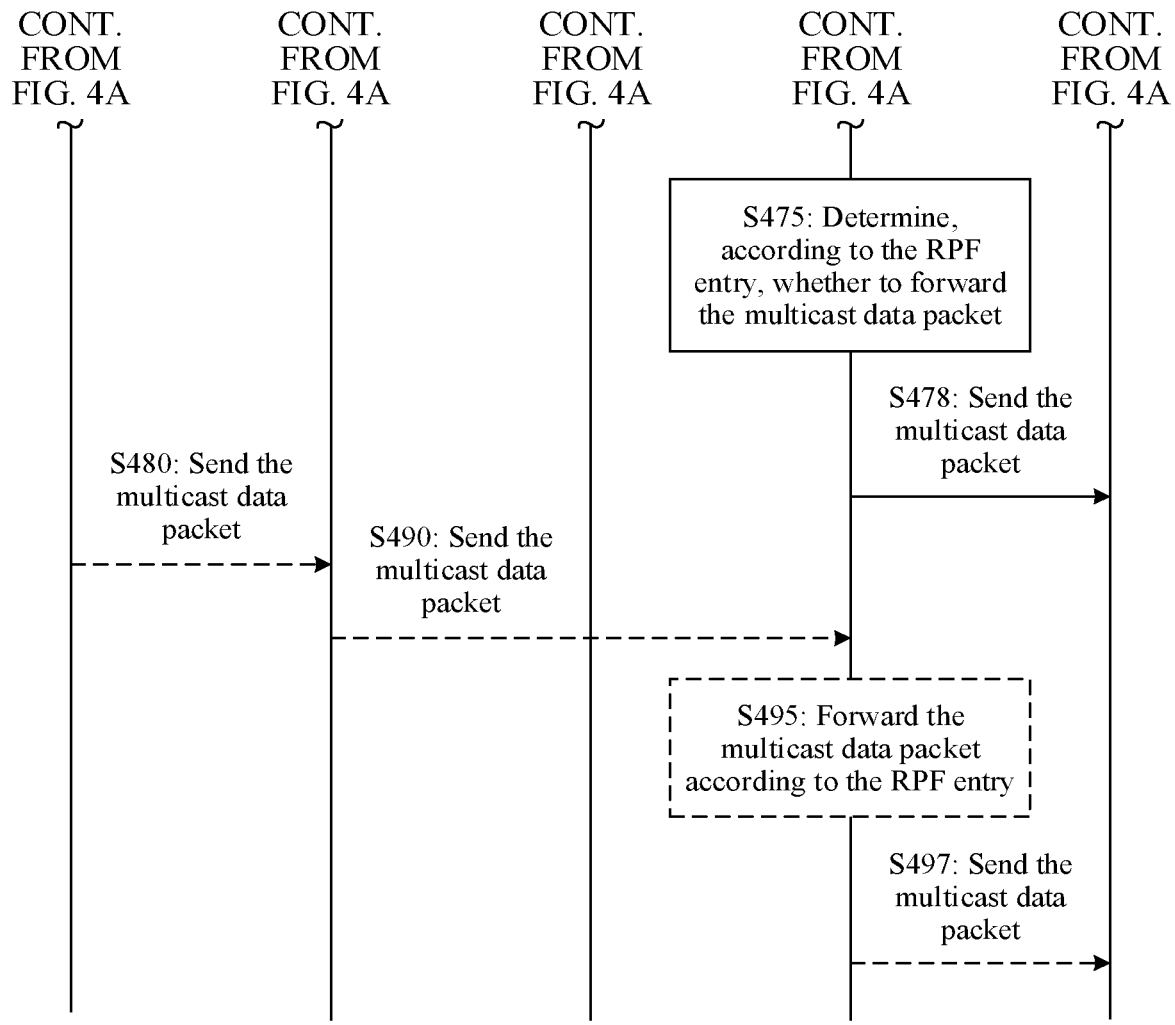

The following describes in detail a specific implementation of the packet forwarding method provided in the embodiments of this application by using the application scenario shown in FIG. 1 as an example and with reference to an embodiment in FIG. 4A and FIG. 4B.

FIG. 4A and FIG. 4B are a schematic flowchart of another packet forwarding method according to an embodiment of this application. As shown in FIG. 4A and FIG. 4B, the method may include steps 410 to 478. The following separately describes steps 410 to 478 in detail.

It should be understood that, for ease of description, descriptions are provided by using an example in which an L1 receives an S1G1 multicast joining message in FIG. 4A and FIG. 4B.

Step 410: An R1 sends a device identifier to the L1.

Step 415: An R2 sends a device identifier to the L1.

In a possible implementation, device identifiers (for example, IP addresses) of the R1/R2 may be configured in this embodiment of this application. The R1/R2 may be used as a first device group.

For example, a network including R1/R2, P1/P2, and L1/L2 is an IP version 4 (IPv4) network. Configurations on the R1 and the R2 are as follows:

```
# Configurations on R1
Interface loopback0
    Ip addr 192.168.1.100 32 ##IP address 0
Interface loopback1
    Ip addr 192.168.1.101 32 ##IP address 1
Multicast mvpn-id 192.168.1.101 Anycast-rpf 192.168.1.100
# Configurations on R2
Interface loopback0
    Ip addr 192.168.1.100 32 ##IP address 0
Interface loopback1
    Ip addr 192.168.1.102 32 ##IP address 2
Multicast mvpn-id 192.168.1.102 Anycast-rpf 192.168.1.100
```

For the configurations on the R1, "Ip addr 192.168.1.101" indicates an IP address 1 of an interface of the R1, and "Multicast mvpn-id 192.168.1.101" indicates that an IP address specified based on mvpn-id in a BGP MVPN is used as an IP address 1 of the R1 in an MVPN message route. For the configurations on the R2, "Ip addr 192.168.1.102 32" indicates an IP address 2 of an interface of the R2, and "Multicast mvpn-id 192.168.1.102" indicates that an IP address specified based on mvpn-id in the BGP MVPN is used as an IP address 2 of the R2 in the MVPN message route.

"Ip addr 192.168.1.100" configured on the R1 and the R2 indicates an identifier, namely, an IP address 0, of the first device group, and "Anycast-rpf 192.168.1.100" indicates that the IP address 0 is used to identify any one of a plurality of addresses during RPF check.

It should be noted that "Ip addr 192.168.1.100" is optional. In other words, if an RPF entry is a correspondence between a multicast packet and the identifier of the first device group, "Ip addr 192.168.1.100" may be configured on the R1 and the R2.

For another example, a network including R1/R2, P1/P2, and L1/L2 is an IPv6 network. Configurations on the R1 and the R2 are as follows:

```
# Configurations on R1
Interface loopback0
    Ipv6 addr 2001:DB1::100   128 ## IPv6 address 0
Interface loopback1
    Ipv6 addr 2001:DB1::101   128 ## IPv6 address 1
Multicast mvpn-id 2001:DB1::101 Anycast-rpf 2001:DB1::100
# Configurations on R2
Interface loopback0
    Ipv6 addr 2001:DB1::100   128 ## IPv6 address 0
Interface loopback1
    Ipv6 addr 2001:DB1::102   128 ## IPv6 address 2
Multicast mvpn-id 2001:DB1::102 Anycast-rpf 2001:DB1::100
```

For the configurations on the R1, "Ipv6 addr 2001:DB1::101" indicates an IPv6 address 1 of an interface of the R1, and "Multicast mvpn-id 2001:DB1::101" indicates that an IP address specified based on mvpn-id in a BGP MVPN is used as an IPv6 address 1 of the R1 in an MVPN message route. For the configurations on the R2, "Ipv6 addr 2001:DB1::102" indicates an IPv6 address 2 of an interface of the R2, and "Multicast mvpn-id 2001:DB1::102" indicates that an IP address specified based on mvpn-id in the BGP MVPN is used as an IPv6 address 2 of the R2 in the MVPN message route.

"IPv6 addr 2001:DB1::100" configured on the R1 and the R2 indicates an identifier, namely, an IPv6 address 0, of the first device group, and "Anycast-rpf 2001:DB1::100" indicates that the IPv6 address 0 is used to identify any one of a plurality of addresses during RPF check.

It should be noted that "Ipv6 addr 2001:DB1::100" is optional. In other words, if an RPF entry is a correspondence between a multicast packet and the identifier of the first device group, "Ipv6 addr 2001:DB1::100" may be configured on the R1 and the R2.

There is a plurality of specific implementations for the R1 and the R2 to send the device identifiers to the L1. The following uses the R1 as an example to describe in detail several possible implementations for the R1 to send an IP address to the L1.

In a possible implementation, the R1 may include the IP address 1 in an advertised BGP-MVPN route. For example, the R1 may include the IP address 1 in a BGP-MVPN inclusive provider multicast service interface (I-PMSI) auto-discovery (A-D) route. For another example, the R1 may include the IP address 1 in a BGP-MVPN selective provider multicast service interface (S-PMSI) A-D route. Optionally, the R1 may also include the IP address 0 in the advertised BGP-MVPN route.

Further, in an example, the R1 sends the IP address 1 and the IP address 0 to the L1 by using a message 1. A possible structure of the message 1 is as follows:

message 1={MP_REACH_NLRI attribute <Type1, RD, IP address 1>, Extended_Community attribute<Type2, IP address 0>}

Type1 identifies an I-PMSI A-D route type or an S-PMSI A-D route type. RD is a route identifier route-distinguisher that distinguishes different VPN instances. The IP address 1 is "192.168.1.101" in this embodiment. Type2 identifies an anycast-rpf address object. The IP address 0 is "192.168.1.100" in this embodiment.

Likewise, the R2 may also include the IP address 2 in the BGP-MVPN I-PMSI A-D route or the BGP-MVPN S-PMSI A-D route. Optionally, the R2 may also include the IP address 0 in the BGP-MVPN I-PMSI A-D route or the BGP-MVPN S-PMSI A-D route. For details, refer to the foregoing descriptions. Details are not described herein again.

In another possible implementation, the R1 may include the IP address 1 in an advertised BGP-EVPN route. For example, the R1 may include the IP address 1 in a BGP-EVPN inclusive multicast Ethernet tag route (IMET). For another example, the R1 may include the IP address 1 in a BGP-EVPN S-PMSI A-D route. Optionally, the R1 may also include the IP address 0 in the advertised BGP-EVPN route.

Further, in an example, another possible structure of a message 1 is as follows:

message 1={MP_REACH_NLRI attribute <Type1, RD, IP address 1>, Extended_Community attribute <Type2, IP address 0>}.

Type1 identifies an IMET route type or an S-PMSI A-D route type. RD is a route identifier route-distinguisher that distinguishes different VPN instances. The IP address 1 is "192.168.1.101" in this embodiment. Type2 identifies an anycast-rpf address object. The IP address 0 is "192.168.1.100" in this embodiment.

Likewise, the R2 may also include the IP address 2 in the BGP-EVPN IMET route or the BGP-MVPN S-PMSI A-D route. Optionally, the R2 may also include the IP address 0 in the BGP-EVPN IMET route or the BGP-MVPN S-PMSI A-D route. For details, refer to the foregoing descriptions. Details are not described herein again.

Step 420: The L1 stores device identifier information of R1/R2.

The L1 may receive the message 1 and a message 2 sent by the R1 and the R2 respectively. The message may be the BGP-MVPN route message, for example, the I-PMSI A-D route message or the S-PMSI A-D route message, or may be the BGP-EVPN route message, for example, the IMET route message or the S-PMSI A-D route message.

In a possible implementation, if the message 1 received by the L1 includes the IP address 1, and the message 2 includes the IP address 2, the L1 may store the IP address 1 and the IP address 2.

In another possible implementation, if the message 1 received by the L1 includes the IP address 1 and the IP address 0, and the message 2 includes the IP address 2 and the IP address 0, the L1 may establish the following mapping relationships:

mapping relationship 1 (IP address 1, IP address 0); and mapping relationship 2 (IP address 2, IP address 0).

In another possible implementation, if the message 1 received by the L1 includes the IPv6 address 1 and the IPv6 address 0, and the message 2 includes the IPv6 address 2 and the IPv6 address 0, the L1 may establish the following mapping relationships:

mapping relationship 3 (IPv6 address 1, IPv6 address 0); and mapping relationship 4 (IPv6 address 2, IPv6 address 0).

Step 430: The L1 receives the S1G1 multicast joining message sent by an H1.

The S1G1 multicast joining message received by the L1 may be an IGMP message, or may be an MLD message. This is not limited in this application. For details, refer to the foregoing descriptions. Details are not described herein again.

Step 440: The L1 establishes an RPF entry.

After the L1 receives the S1G1 multicast joining message from the H1, the L1 selects a UMH node corresponding to S1G1. The UMH node is a node from which the L1 node expects to receive the S1G1 multicast traffic. Further, the L1 may obtain UMH information according to a unicast route to S1, for example, the L1 may learn that a next hop of the unicast route to S1 is a primary next-hop IP address 1 or a secondary next-hop IP address 2. In this case, the L1 expects that the S1G1 multicast traffic comes from the IP address 1.

The L1 may forward a multicast packet sent from either the IP address 1 or the IP address 2 in this embodiment of this application. Further, in an example, the L1 may be configured, so that the L1 may forward the multicast packet sent from either the IP address 1 or the IP address 2.

For example, if a network including R1/R2, P1/P2, and L1/L2 is an IPv4 network, configurations on the L1 are as follows:

```
# Configurations on L1
Interface loopback0
    Ip addr 192.168.2.201 32
    Multicast mvpn-id 192.168.1.201
Ip vpn vpn1
    Ipv4-family or ipv6-family
Mvpn
    Anycast-rpf enable
```

For another example, if a network including R1/R2, P1/P2, and L1/L2 is an IPv6 network, configurations on the L1 are as follows:

```
# Configurations on L1
Interface loopback0
    Ipv6 addr 2001:DB1::201 128
    Multicast mvpn-id 2001:DB1::201
Ip vpn vpn1
    Ipv4-family
Mvpn
    Anycast-rpf enable
```

"ip vpn vpn1" indicates that a VPN instance is configured. "ipv4-family" indicates that a VPN IPv4 address family, also referred to as a VPNv4, is configured. Alternatively, "ipv6-family" indicates that a VPN IPv6 address family, also referred to as a VPNv6, may be configured. "Mvpn" indicates that mvpn is enabled for the VPN instance, and the VPN instance is also referred to as an MVPN instance. "Anycast-rpf enable" indicates that anycast-rpf is enabled. In other words, anycast-rpf information included in messages sent by R1/R2 may be processed, or an object (for example, the identifier, namely, the IP address 0, of the first device group in this embodiment of this application) may be used during RPF check, to identify any one of a plurality of IP addresses.

It should be noted that "Anycast-rpf enable" is optional. In other words, this configuration may not be set. By default, a system processes the anycast-rpf information included in the received messages sent by the R1/R2.

In this application, based on the configuration "Anycast-rpf enable", after the L1 obtains the primary next-hop IP address 1 and the secondary next-hop IP address 2, the L1 expects that the S1G1 multicast traffic comes from either the IP address 1 or IP address 2. Therefore, the L1 establishes the RPF entry.

The following uses an example in which a network including R1/R2, P1/P2, and L1/L2 is an IPv4 network.

A possible RPF entry is (S1, UMH<IP address 1, IP address 2>). The RPF entry indicates to forward an S1G1 multicast packet sent by a device corresponding to the IP address 1, or to forward an S1G1 multicast packet sent by a device corresponding to the IP address 2.

Another possible RPF entry includes a first sub-entry and a second sub-entry. The first sub-entry is (S1, UMH<IP address 1>), to indicate to forward an S1G1 multicast packet sent by a device corresponding to the IP address 1. The second sub-entry is (S1, UMH<IP address 2>), to indicate to forward the S1G1 multicast packet sent by a device corresponding to the IP address 2.

Optionally, if the message 1 received by the L1 includes the IP address 1 and the IP address 0, and the message 2 includes the IP address 2 and the IP address 0, the L1 may further establish the RPF entry (S1, Anycast-UMH<IP address 0>), (IP address 1, IP address 0), and (IP address 2, IP address 0) based on the mapping relationship 1 and the mapping relationship 2, to indicate that the L1 expects that the multicast traffic (S1, G1) comes from a device group identified by the anycast IP address 0. The anycast IP address 0 includes the device R1 represented by using the IP address 1 and the device R2 represented by using the IP address 2. The IP address 0 may be used to identify either the IP address 1 or the IP address 0.

The following uses an example in which a network including R1/R2, P1/P2, and L1/L2 is an IPv6 network.

A possible RPF entry is (S1, UMH<IPv6 address 1, IPv6 address 2>). The RPF entry indicates to forward an S1G1 multicast packet sent by a device corresponding to the IPv6 address 1, or to forward an S1G1 multicast packet sent by a device corresponding to the IPv6 address 2.

Another possible RPF entry includes a first sub-entry and a second sub-entry. The first sub-entry is (S1, UMH<IPv6 address 1>), to indicate to forward an S1G1 multicast packet sent by a device corresponding to the IPv6 address 1. The second sub-entry is (S1, UMH<IPv6 address 2>), to indicate to forward the S1G1 multicast packet sent by a device corresponding to the IPv6 address 2.

Optionally, if the message 1 received by the L1 includes the IPv6 address 1 and the IPv6 address 0, and the message 2 includes the IPv6 address 2 and the IPv6 address 0, the L1 may further establish the RPF entry (S1, Anycast-UMH<IPv6 address 0>), (IPv6 address 1, IPv6 address 0), and (IPv6 address 2, IPv6 address 0) based on the mapping relationship 3 and the mapping relationship 4. The IPv6 address 0 may be used to identify either the IPv6 address 1 or the IPv6 address 0.

Step 450: The L1 sends the multicast joining message to the R1.

Step 451: The L1 sends the multicast joining message to the R2.

The L1 may send the multicast joining message to the R1 by using a message 3, and send the multicast joining message to the R2 by using a message 4. The message 3 and the message 4 may be BGP-MVPN messages or BGP-EVPN messages.

Optionally, the message 3 sent by the L1 to the R1 may further carry the IP address 1 of the R1, so that the R1 determines that the multicast joining is sent to the R1 and sends the multicast joining message to a multicast source. Likewise, the message 4 sent by the L1 to the R2 may further carry the IP address 2 of the R2, so that the R2 determines that the multicast joining is sent to the R2 and sends the multicast joining message to the multicast source.

Step 455: The R1 sends the multicast joining message to the multicast source.

Step 456: The R2 sends the multicast joining message to the multicast source.

In this embodiment of this application, the R1 or the R2 may send the multicast joining message to the multicast source, or both the R1 and the R2 may send the multicast joining message to the multicast source. In other words, in this embodiment, only step 455 may be performed, or only step 456 may be performed, or both step 455 and step 456 may be performed.

Step 460: The multicast source sends the S1G1 multicast data packet to the R1.

The multicast source may send the S1G1 multicast data packet to both the R1 and the R2 in this application. Alternatively, the multicast source may send the S1G1 multicast data packet to one node of the R1/R2. In other words, the multicast source may send the S1G1 multicast data packet to the R1, or may send the S1G1 multicast data packet to the R2.

For ease of description, descriptions are provided by using an example in which the multicast source sends the S1G1 multicast data packet to the R1 in FIG. 4A and FIG. 4B.

In a possible implementation, an interface of the multicast source may be configured as an Eth-trunk interface, and multicast traffic of the multicast source is sent to either the R1 or the R2. Further, two interfaces used to connect the multicast source to the R1/R2 may be configured as Eth-trunk interfaces. Optionally, interfaces of the R1/R2 also need to be configured as Eth-trunk interfaces in some systems. The multicast source sends the S1G1 multicast data packet to only one of the interfaces connected to the R1/R2.

In another possible implementation, both the R1 and the R2 may send the multicast joining message to the multicast source, to ingest the multicast packet to the R1 and the R2. Then, the R1/R2 determines, based on a mutual message between the devices, that either of the devices to forward the multicast packet.

In another possible implementation, the R1/R2 may use one anycast IP address to receive the multicast packet from the multicast source. For example, the multicast packet is encapsulated into a unicast packet, and a destination address of the unicast packet is the anycast IP address. In this way, the multicast packet reaches either the R1 or the R2, rather than a plurality of devices. It should be understood that, in this implementation, the unicast packet received by either the R1 or the R2 includes an outer IP header. The R1 or the R2 may decapsulate the packet when a destination address in the outer IP header in the unicast packet is the R1 or the R2, and obtain the inner S1G1 multicast data packet.

It should be noted that the anycast IP address may be the same as or different from the anycast IP address 0 used for the anycast RPF described above. This is not limited in this application.

It should be understood that, for ease of description, descriptions are provided by using an example in which the multicast source sends the S1G1 multicast data packet to the R1 in FIG. 4A and FIG. 4B.

Step 470: The R1 sends the S1G1 multicast data packet to the L1.

Optionally, in an example, the R1 may have the following configurations:

```
# Configurations on R1
Ip vpn vpn1
    Ipv4-family or ipv6-family
Mvpn
    Sender-enable
    Anycast-rpf enable
```

"ip vpn vpn1" indicates that a VPN instance is configured. "ipv4-family" indicates that a VPN IPv4 address family, also referred to as a VPNv4, is configured. "ipv6-family" indicates that a VPN IPv6 address family, also referred to as a VPNv6, is configured. "Mvpn" indicates that mvpn is enabled for the VPN instance, and the VPN instance is also referred to as an MVPN instance. "sender-enable" indicates that a node used as an MVPN multicast sender may forward the multicast packet sent by the multicast source. "Anycast-rpf enable" indicates that anycast-rpf is enabled. It may be understood that if "sender-enable" is configured, a message sent from a node to a leaf node may carry anycast-rpf information.

The R1 sends the S1G1 multicast data packet to the L1 through a core network in a plurality of manners. In a possible implementation, the R1 may send the S1G1 multicast data packet to the L1 through a point-to-multipoint (P2MP) tunnel. In another possible implementation, the R1 may send the S1G1 multicast data packet to the L1 through a Bit Index Explicit Replication (BIER)-Multi-Protocol Label Switching (MPLS) tunnel. In another possible implementation, the R1 may send the S1G1 multicast data packet to the L1 through a BIER IPv6 (BIERv6) tunnel.

For example, the R1 may send the S1G1 multicast data packet to the L1 through the P2MP tunnel. The S1G1 multicast data packet may be encapsulated in the following format:

(P2MP label, IP packet <S1G1>).

A P2MP label encapsulated when the R1 sends, to a next-hop node, the S1G1 multicast data packet that is to be sent to the L1 is a label allocated by the next-hop node between the R1 node and the L1 node to the P2MP tunnel. For example, a P1 node encapsulated when the R1 sends the S1G1 multicast data packet to the P1 is a label allocated by the P1 to the P2MP tunnel. A P2MP label encapsulated when the P1 sends, to a next-hop node, the S1G1 multicast data packet that is to be sent to the L1 is a label allocated by the next-hop node between the P1 node and the L1 node to the P2MP tunnel. For example, the L1 node encapsulated when the P1 sends the S1G1 multicast data packet to the L1 is a label allocated by the L1 to the P2MP tunnel. The P2MP tunnel may be identified by using a forwarding equal class (FEC). The FEC of the P2MP tunnel includes an IP address of a head node and a tunnel ID. For example, (head node R1, tunnel ID=1) is an FEC, and (head node R1, tunnel ID=2) is another FEC. A node allocates a label to a P2MP tunnel, which means that the node generates a label corresponding to an FEC, for example, allocates a label Label1 to (head node R1, tunnel ID=1), and allocates a label Label2 to (head node R1, tunnel ID=2).

For example, the R1 may send the S1G1 multicast data packet to the L1 through the BIER-MPLS tunnel. The S1G1 multicast data packet may be encapsulated in the following format:

(BIER Header, Optional VpnLabel, IP packet <S1G1>).

A BIER label in a BIER header encapsulated when the R1 sends, to a next-hop node, the S1G1 multicast data packet that is to be sent to the L1 is a label allocated by the next-hop node between the R1 node and the L1 node to the BIER tunnel. For example, a P1 node encapsulated when the R1 sends the S1G1 multicast data packet to the P1 is a BIER label allocated by the P1 to the BIER tunnel. A BIER label encapsulated when the P1 sends, to a next-hop node, the S1G1 multicast data packet that is to be sent to the L1 is a label allocated by the next-hop node between the P1 node and the L1 node to the BIER tunnel. For example, an L1 node encapsulated when the P1 sends the S1G1 multicast data packet to the L1 is a BIER label allocated by the L1 to the BIER tunnel. The BIER tunnel or the BIER label may correspond to and be identified by a triplet (a sub-domain identifier (sub-domain-id), a bit string length (BSL), and a set identifier (SI)). For example, the L1 allocates a label Label1 to a triplet (0, 256, 0), and the P1 allocates a label Label2 to a triplet (0, 256, 0). The R1 encapsulates the label Label2 as BIERLabel in a BIER header when sending the packet using the triplet (0, 256, 0) to the P1. The P1 learns the triplet (0, 256, 0) corresponding to the packet based on Label2, and encapsulates the label Label1 as BIERLabel in a BIER header when forwarding the packet to the L1 based on BIER.

For example, the R1 may send the S1G1 multicast data packet to the L1 through the BIERv6 tunnel. The S1G1 multicast data packet may be encapsulated in the following format:

(outer IPv6, outer IPv6 extension header <with BIER header>, IP packet <S1G1>).

A source address in the outer IPv6 encapsulated by the R1 is the IPv6 address of the R1 node, a bit location corresponding to the L1 node in BitString in a BIER header is 1, and the packet sent by the R1 is sent to the L1 by using the P1.

Step 475: The L1 determines, according to the RPF entry, whether to forward the S1G1 multicast data packet delivered by the R1.

Further, the L1 performs anycast RPF check after receiving the S1G1 multicast data packet.

In a possible implementation, the L1 receives the multicast data packet from the P2MP tunnel, and the L1 learns, based on the P2MP label, an IP address from which the packet actually comes. For example, the P2MP label in the packet received by the L1 is Label1, and the L1 stores a correspondence (FEC<IP address of head node R1=IP address 1, tunnel ID=1>, P2MP Label=Label1). In this case, the L1 may know, based on Label1, that the packet actually comes from the IP address 1. The L1 learns, according to the mapping relationship 1, that the IP address from which the packet actually comes may be mapped to the IP address 0, namely, a device group from which the packet actually comes. The L1 learns, based on an expected Anycast-UMH in the RPF entry, that an expected UMH for the packet is the IP address 0. If the two UMHs are the same, the RPF check succeeds, and the L1 may forward the multicast data packet to the H1.

In another possible implementation, the L1 receives the multicast data packet from the BIER tunnel, and the L1 learns, based on the BIER header, an IP address from which the packet actually comes. For example, the BIER label in the BIER header of the packet received by the L1 is Label1, and the L1 stores a correspondence (<0, 256, 0>, BIER Label=Label1). In this case, the L1 may know, based on Label1, that the packet corresponds to the triplet <0, 256, 0>. The L1 may obtain that the packet actually comes from the IP address 1 based on BFIR-id=X in the BIER header, Sub-domain-id=0 corresponding to the packet, and a correspondence <Sub-domain-id=0, BFIR-id=X, BFIR-prefix=IP address 1> stored in the L1. The L1 learns, according to the mapping relationship 1, that the IP address from which the packet actually comes may be mapped to the IP address 0. The L1 learns, based on an expected Anycast-UMH in the RPF entry, that an expected UMH for the packet is the IP address 0. If the two UMHs are the same, the RPF check succeeds, and the L1 may forward the multicast data packet to the H1.

In another possible implementation, the L1 receives the multicast data packet from the BIERv6 tunnel, and the L1 learns, based on the source address in the outer IPv6 header, an IP address from which the packet actually comes. For example, the source address in the outer IPv6 header in the packet received by the L1 is the IPv6 address 1. The L1 learns, according to the mapping relationship 3, that the IP address from which the packet actually comes may be mapped to the IPv6 address 0. The L1 learns, based on an expected Anycast-UMH in the RPF entry, that an expected UMH for the packet is the IPv6 address 0. If the two UMHs are the same, the RPF check succeeds, and the L1 may forward the multicast data packet to the H1.

Step 478: The L1 forwards the multicast data packet to the H1.

Optionally, in some embodiments, that a communication link between the L1 and the multicast source fails may be understood as that the node R1 fails, a link between the node R1 and the multicast source fails, or links between the R1 and the P1/P2 fail. As shown in FIG. 4B, the method may further include steps 480 to 497. The following separately describes steps 480 to 497 in detail.

Step 480: The multicast source sends the S1G1 multicast data packet to the R2.

It should be understood that if the communication link between the R1 and the multicast source fails, for example, as shown in FIG. 1, the device CE 1 fails, or a communication link between the CE 1 and the multicast source fails, the multicast source may send the multicast data packet to the R2, and the R2 sends the multicast data packet to the L1. The following describes in detail a specific implementation of determining the foregoing fault.

For example, it is determined that the R1 node fails. In this application, if the multicast source detects that a state of an interface connected to the R1 is down, it may be determined that the R1 node fails. The multicast source does not send the multicast data packet to the R1 node any longer. Optionally, if the multicast source detects that a state of an interface connected to the R2 is up, the multicast source may send the multicast data packet to the R2.

For example, it is determined that a link between the R1 and the P1 fails or a link between the R1 and the P2 fails. After the R1 detects that a state of an interface of the R1 is down, the R1 may disable the link between the R1 and the multicast source, so that the multicast source detects that the state of the interface connected to the R1 is down, and a state of an interface connected to the R2 is up. In this case, the multicast source sends the multicast data packet to the R2.

Optionally, in some embodiments, after the R1 detects that the state of the interface of the R1 is down and before the R1 disables the link between the R1 and the multicast source, the following configurations may be further performed:

```
monitor-group xxx ## Create an interface monitor group and enter an interface monitor group view
binding interface Gi1/0/1 ## Bind an interface connected to the P1 to the interface monitor group
binding interface Gi2/0/1 ## Bind an interface connected to the P2 to the interface monitor group
monitor enable ## Enable monitoring of the interface monitor group
interface Gi4/0/1 ## Connect to an interface of an SRC
track monitor-group xxx ##Configure a track monitor group, and disable this interface if an interface in the monitor group fails
```

Step 490: The R2 sends the S1G1 multicast data packet to the L1.

Optionally, in an example, the R2 may have the following configurations:

```
# Configurations on R2
Ip vpn vpn1
    Ipv4-family or ipv6-family
    Mvpn
        Sender-enable
        Anycast-rpf enable
```

The configurations are similar to the configurations on the R1 in step 470. For details, refer to the descriptions of configuration information in step 470. Details are not described herein again.

After receiving the S1G1 multicast data packet, the R2 encapsulates the multicast data packet based on the MVPN configuration on the R2, and sends the packet to the L1 through the core network. The R2 sends the S1G1 multicast data packet to the L1 through the core network in a plurality of manners. In a possible implementation, the R2 may send the S1G1 multicast data packet to the L1 through a P2MP tunnel. In another possible implementation, the R2 may send the S1G1 multicast data packet to the L1 through a BIER-MPLS tunnel. In another possible implementation, the R2 may send the S1G1 multicast data packet to the L1 through a BIERv6 tunnel. A specific implementation is similar to that in step 470. For details, refer to the descriptions in step 470. Details are not described herein again.

Step 495: The L1 determines, according to the RPF entry, whether to forward the S1G1 multicast data packet delivered by the R2.

Further, the L1 performs anycast RPF check after receiving the S1G1 multicast data packet.

In a possible implementation, the L1 receives the multicast data packet from the P2MP tunnel, and the L1 learns, based on the P2MP label, an IP address from which the packet actually comes. For example, the P2MP label in the packet received by the L1 is Label2, and the L1 stores a correspondence (FEC<IP address of head node R1=IP address 2, tunnel ID=1>, P2MP Label=Label2). In this case, the L1 may know, based on Label2, that the packet actually comes from the IP address 2. The L1 learns, based on an expected Anycast-UMH in the RPF entry, that an expected UMH for the packet is the IP address 0. If the two UMHs are the same, the RPF check succeeds, and the L1 may forward the multicast data packet to the H1.

In another possible implementation, the L1 receives the multicast data packet from the BIER tunnel, and the L1 learns, based on the BIER header, an IP address from which the packet actually comes. For example, the BIER label in the BIER header of the packet received by the L1 is Label1, and the L1 stores a correspondence (<0, 256, 0>, BIER Label=Label1). In this case, the L1 may know, based on Label1, that the packet corresponds to the triplet <0, 256, 0>. The L1 may obtain that the packet actually comes from the IP address 2 based on BFIR-id=Y in the BIER header, Sub-domain-id=0 corresponding to the packet, and a correspondence (<Sub-domain-id=0, BFIR-id=Y, BFIR-prefix=IP address 2>) stored in the L1. The L1 learns, according to the mapping relationship 2, that the IP address from which the packet actually comes may be mapped to the IP address 0. The L1 learns, based on an expected Anycast-UMH in the RPF entry, that an expected UMH for the packet is the IP address 0. If the two UMH are the same, the RPF check succeeds, and the L1 may forward the multicast data packet to the H1.

In another possible implementation, the L1 receives the multicast data packet from the BIERv6 tunnel, and the L1 learns, based on the outer IPv6 header, an IPv6 address from which the packet actually comes, for example, the source address, that is, the IPv6 address 2 in the outer IPv6 header in the packet received by the L1. The L1 learns, according to the mapping relationship 4, that the IP address from which the packet actually comes may be mapped to the IPv6 address 0. The L1 learns, based on an expected Anycast-UMH in the RPF entry, that an expected UMH for the packet is the IPv6 address 0. If the two UMHs are the same, the RPF check succeeds, and the L1 may forward the multicast data packet to the H1.

Step 497: The L1 forwards the multicast data packet to the H1.

In the foregoing technical solution, on the one hand, when there is no fault, traffic sent by the multicast source is sent only to the R1, and only the R1 sends the traffic to the L1 through the core network. Therefore, there is only one copy of multicast traffic in the core network, and there is no need to use one more copy of multicast traffic. On the other hand, when the link between the R1 node and the multicast source fails, the traffic sent by the multicast source is sent only to the R2, only the R2 sends the traffic to the L1 through the core network, and the R2 does not need to wait for the L1 to send the multicast joining message. This can implement faster service recovery.

Figure 5A:
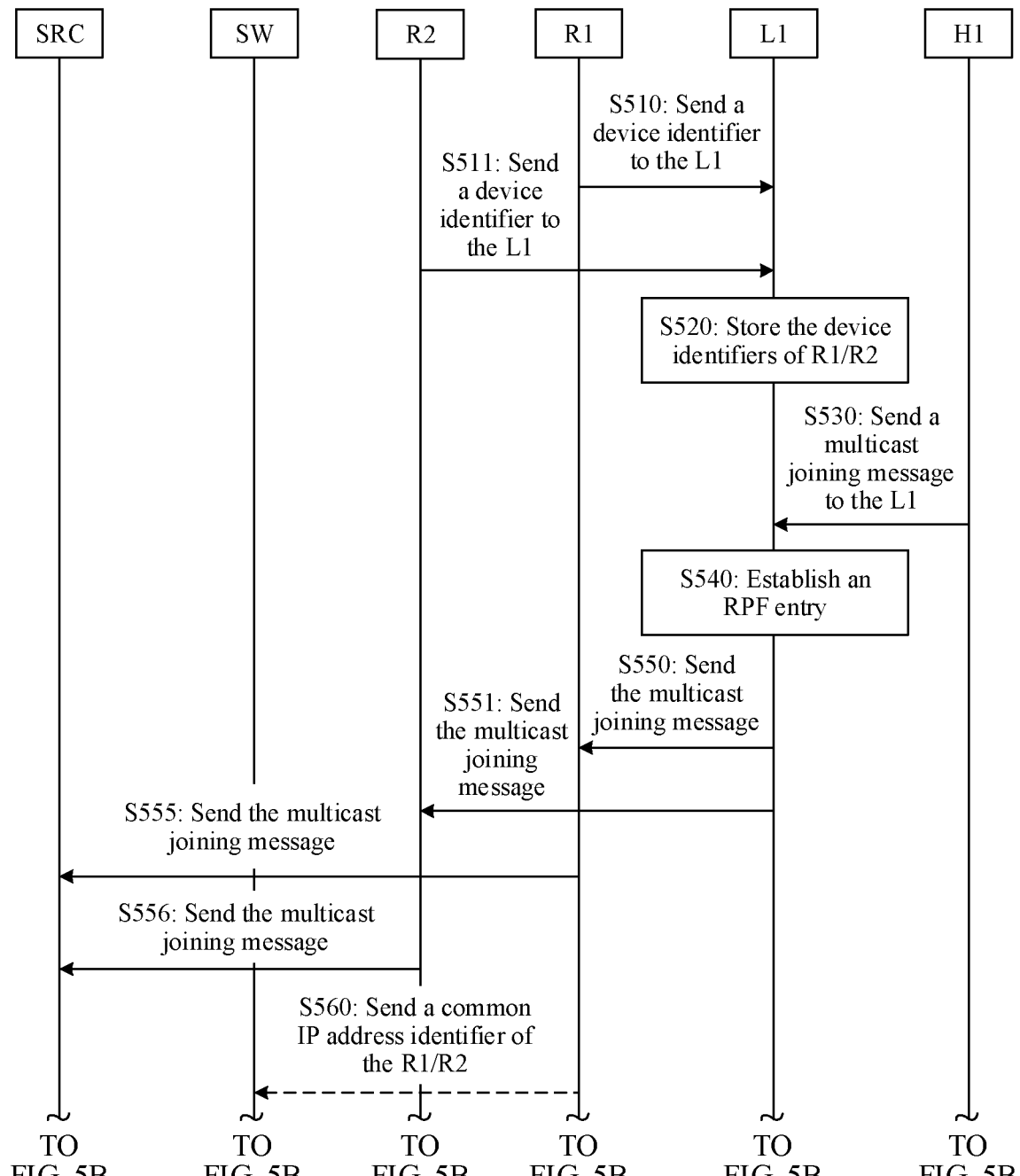
FIG. 5A and FIG. 5B are a schematic flowchart of another packet forwarding method according to an embodiment of this application.
Figure 5B:
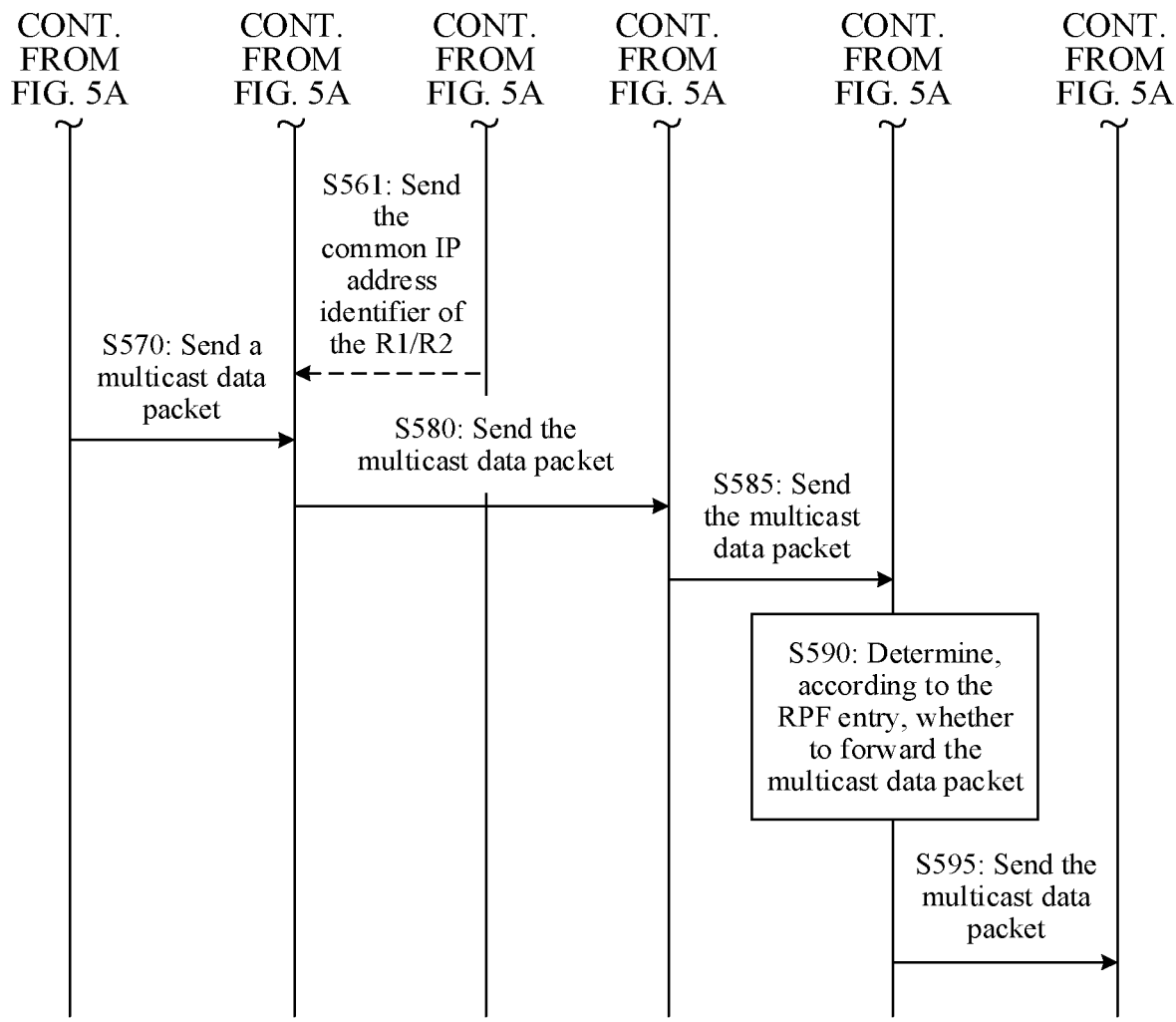

The following describes in detail a specific implementation of the packet forwarding method provided in the embodiments of this application by using a scenario shown in FIG. 2 as an example and with reference to an embodiment in FIG. 5A and FIG. 5B.

FIG. 5A and FIG. 5B are a schematic flowchart of another packet forwarding method according to an embodiment of this application. As shown in FIG. 5A and FIG. 5B, the method may include steps 510 to 595. The following separately describes steps 510 to 595 in detail.

Step 510: An R1 sends a device identifier to an L1.

Step 511: An R2 sends a device identifier to the L1.

Step 520: The L1 stores device identifier information of R1/R2.

Step 530: The L1 receives an S1G1 multicast joining message sent by an H1.

Step 540: The L1 establishes an RPF entry.

Step 550: The L1 sends the multicast joining message to the R1.

Step 551: The L1 sends the multicast joining message to the R2.

Step 555: The R1 sends the multicast joining message to a multicast source.

Step 556: The R2 sends the multicast joining message to the multicast source.

Step 560: The R1 sends an SW a common IP address identifier of the R1/R2.

Step 561: The R2 sends the SW the common IP address identifier of the R1/R2.

It should be noted that step 560 and step 561 are optional. The common IP address identifier of the R1/R2 may also be configured on the SW in this embodiment of this application.

In some embodiments, for example, the R1/R2 in a segmented MVPN further send the common IP address identifier of the R1/R2 to the SW. The SW may statically configure the common IP address identifier of the R1 and the R2. In this application, the common IP address identifier may be, for example, the IP address 0 or another common identifier (for example, may be an integer). For ease of description, the following is described by using an example in which the IP address 0 (192.168.1.100) in the foregoing configuration example is used as the common IP address identifier of the R1/R2.

In a possible implementation, the R1/R2 may include the IP address 0 in an advertised BGP-MVPN route. For example, the R1/R2 may include the IP address 0 in a BGP-MVPN I-PMSI A-D route. For another example, the R1/R2 may further include the IP address 0 in a BGP-MVPN S-PMSI A-D route.

In another possible implementation, the R1/R2 may include the IP address 0 in an advertised BGP-EVPN route. For example, the R1/R2 may include the IP address 0 in a BGP-MVPN IMET route. For another example, the R1/R2 may further include the IP address 0 in a BGP-EVPN S-PMSI A-D route.

The message format is similar to the structure of the message 1 or the message 2 in step 410. For details, refer to the descriptions in step 410. Details are not described herein again.

In another possible implementation, the common IP address or an anycast address of the R1 and the R2 may be statically configured on the SW, and used as a destination address for the SW to send the packet to a device group including the R1 and the R2. For example, an SW may configure a destination address of a generic routing encapsulation (GRE) tunnel as a common IP address of an R1 and an R2, and then the SW encapsulates a multicast data packet to the GRE tunnel, namely, encapsulates an outer IP header and a GRE header in the multicast data packet, where a destination addresses in the outer IP header is an anycast address of the R1 and the R2.

It should be understood that, for ease of description, descriptions are provided by using an example in which the R1 sends the common IP address identifier of the R1/R2 to the SW in FIG. 5A and FIG. 5B.

Step 570: The multicast source sends an S1G1 multicast data packet to the SW.

Step 580: The SW sends the S1G1 multicast data packet to the R1.

In the scenario in FIG. 2, the multicast source may first send the S1G1 multicast data packet to the SW, and the SW encapsulates an outer unicast IP header in the S1G1 multicast data packet, where a destination address in the outer unicast IP header is the common IP address identifier of the R1/R2. For example, the SW encapsulates the outer unicast IP header in the S1G1 multicast data packet, where the destination address in the outer unicast IP header is the IP address 0 (192.168.1.100). After receiving the packet sent by the SW, any one of the R1/R2 decapsulates the packet based on a case that the destination address in the outer IP header of the packet is any one of the R1/R2, to obtain the inner S1G1 multicast data packet. Any one of the R1/R2 sends the S1G1 multicast data packet to the L1 through a core network.

For ease of description, descriptions are provided by using an example in which the SW sends the S1G1 multicast data packet to the R1 in FIG. 5A and FIG. 5B.

Step 585: The R1 sends the S1G1 multicast data packet to the L1.

The step corresponds to step 470. For details, refer to the description in the step 470. The details are not described herein again.

Step 590: The L1 determines, according to the RPF entry, whether to forward the S1G1 multicast data packet delivered by the R1.

Step 595: The L1 forwards the multicast data packet to the H1.

The step corresponds to step 478. For details, refer to the description in the step 478. The details are not described herein again.

In the scenario shown in FIG. 2, if the communication link between the L1 and the multicast source fails, where a failure of the communication link may be understood as that the R1 fails, the device CE 1 fails, the SW device fails, or links between the R1 and the P1/P2 fail, the multicast source may send the multicast data packet to the R2, and the R2 sends the multicast data packet to the L1. A specific implementation method corresponds to step 480 to step 497 in FIG. 4A and FIG. 4B. For details, refer to the descriptions in FIG. 4A and FIG. 4B. Details are not described herein again.

The foregoing describes in detail the packet forwarding method provided in the embodiments of this application with reference to FIG. 1 to FIG. 5A and FIG. 5B. The following describes in detail apparatus embodiments in this application with reference to FIG. 6 to FIG. 8. It should be understood that, descriptions of the method embodiment correspond to descriptions of the apparatus embodiments. Therefore, for a part not described in detail, refer to the method embodiment.

Figure 6:
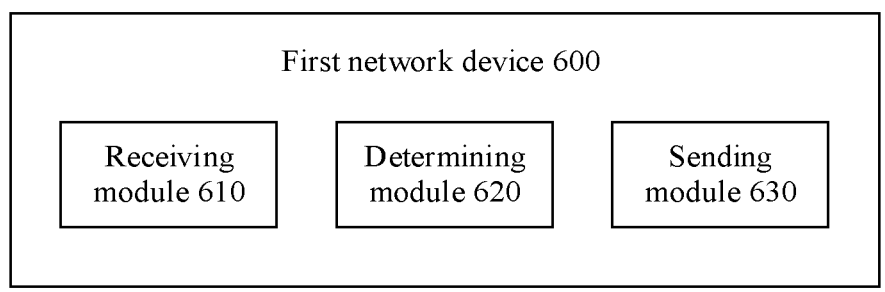
FIG. 6 is a schematic diagram of a structure of a first network device according to an embodiment of this application.

FIG. 6 is a schematic diagram of a structure of a first network device 600 according to an embodiment of this application. The first network device 600 shown in FIG. 6 may perform the corresponding steps performed by the first network device in the methods in the foregoing embodiments. As shown in FIG. 6, the first network device 600 includes a receiving module 610, a determining module 620, and a sending module 630.

The receiving module 610 is configured to receive a first multicast packet sent by a multicast source device and forwarded by a first device group, where the first device group includes a second network device and a third network device, and the first multicast packet is forwarded to the first network device by one network device in the first multicast group.

The determining module 620 is configured to determine, according to a RPF entry, that the first multicast packet is a multicast packet forwarded by the first device group, where the RPF entry includes a first sub-entry and a second sub-entry, the first sub-entry indicates the first network device to forward the first multicast packet sent by the second network device, and the second sub-entry indicates the first network device to forward the first multicast packet sent by the third network device.

The sending module 630 is configured to send the first multicast packet to a multicast destination device according to the RPF entry.

In a possible implementation, a first communication link is in a normal state. The first communication link is a communication link from the multicast source device to the second network device and then to the first network device. The sending module 630 is further configured to send the first multicast packet to the multicast destination device according to the first sub-entry.

In another possible implementation, a second communication link is in a normal state. The second communication link is a communication link from the multicast source device to the third network device and then to the first network device. The receiving module 610 is further configured to receive the first multicast packet forwarded through the first communication link. A metric of the first communication link is less than a metric of the second communication link.

In another possible implementation, when a first communication link is in a fault state, and a second communication link is in a normal state, the sending module 630 is further configured to send the first multicast packet to the multicast destination device according to the second sub-entry.

In another possible implementation, the receiving module 610 is further configured to receive first control information sent by the second network device, where the first control information includes a second identifier, and the second identifier is an identifier of the second network device. The first network device further includes a generation module configured to generate the first sub-entry based on the second identifier, where the first sub-entry is a correspondence between the second identifier and a multicast source group (S, G) corresponding to the first multicast packet. The receiving module is further configured to receive second control information sent by the third network device, where the second control information includes a third identifier, and the third identifier is an identifier of the third network device. The generation module is further configured to generate the second sub-entry based on the third identifier, where the second sub-entry is a correspondence between the third identifier and the multicast source group (S, G) corresponding to the first multicast packet.

In another possible implementation, the second identifier and the third identifier are IP addresses or IPv6 addresses.

In another possible implementation, the first device group identifier is an IP address, an IPv6 address, or an integer.

In another possible implementation, the first control information further includes a first device group identifier. The second control information further includes the first device group identifier. The first device group identifier is an identifier of the first device group. The determining module 620 is further configured to determine the RPF entry based on the first device group identifier.

Figure 7:
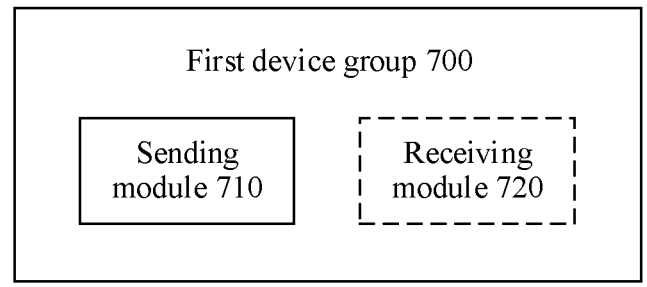
FIG. 7 is a schematic diagram of a structure of a first device group according to an embodiment of this application.

FIG. 7 is a schematic diagram of a structure of a first device group 700 according to an embodiment of this application. The first device group 700 shown in FIG. 7 may perform the corresponding steps performed by the first device group in the methods in the foregoing embodiments. As shown in FIG. 7, the first device group 700 includes a sending module 710.

The sending module 710 is configured to send, by using a second network device in the first device group, a second identifier and a first device group identifier to a first network device, where the first device group includes the second network device and a third network device, the second identifier is an identifier of the second network device, and the first device group identifier is an identifier of the first device group.

The sending module 710 is further configured to send, by using the third network device in the first device group, a third identifier and the first device group identifier to the first network device, where the third identifier is an identifier of the third network device, the second identifier, the third identifier, and the first device group identifier are used to trigger the first network device to generate an RPF entry based on the second identifier, the third identifier, and the first device group identifier, the RPF entry includes a first sub-entry and a second sub-entry, the first sub-entry indicates the first network device to forward a first multicast packet sent by the second network device in the first device group, and the second sub-entry indicates the first network device to forward the first multicast packet sent by the third network device in the first device group.

In a possible implementation, the first device group 700 further includes that a receiving module 720 configured to receive, by using a network device in the first device group, the first multicast packet sent by a multicast source device. The sending module is further configured to forward, by using the network device in the first device group, the first multicast packet to the first network device.

In another possible implementation, the sending module 710 is further configured to receive, by using the network device in the first device group, a unicast packet sent by the multicast source, where the first multicast packet is encapsulated in the unicast packet.

In another possible implementation, a destination address of the unicast packet is the first device group identifier.

In another possible implementation, a first communication link is in a normal state. The first communication link is a communication link from the multicast source device to the second network device and then to the first network device. The sending module 710 is further configured to forward, by using the second network device in the first device group, the first multicast packet received from the multicast source device to the first network device.

In another possible implementation, a second communication link is in a normal state. The second communication link is a communication link from the multicast source device to the third network device and then to the first network device. A metric of the first communication link is less than a metric of the second communication link.

In another possible implementation, when a first communication link is in a fault state, and a second communication link is in a normal state, the sending module 710 is further configured to forward, by using the third network device in the first device group, the first multicast packet received from the multicast source device to the first network device.

In another possible implementation, the first device group identifier is an IP address, an IPv6 address, or an integer.

Figure 8:
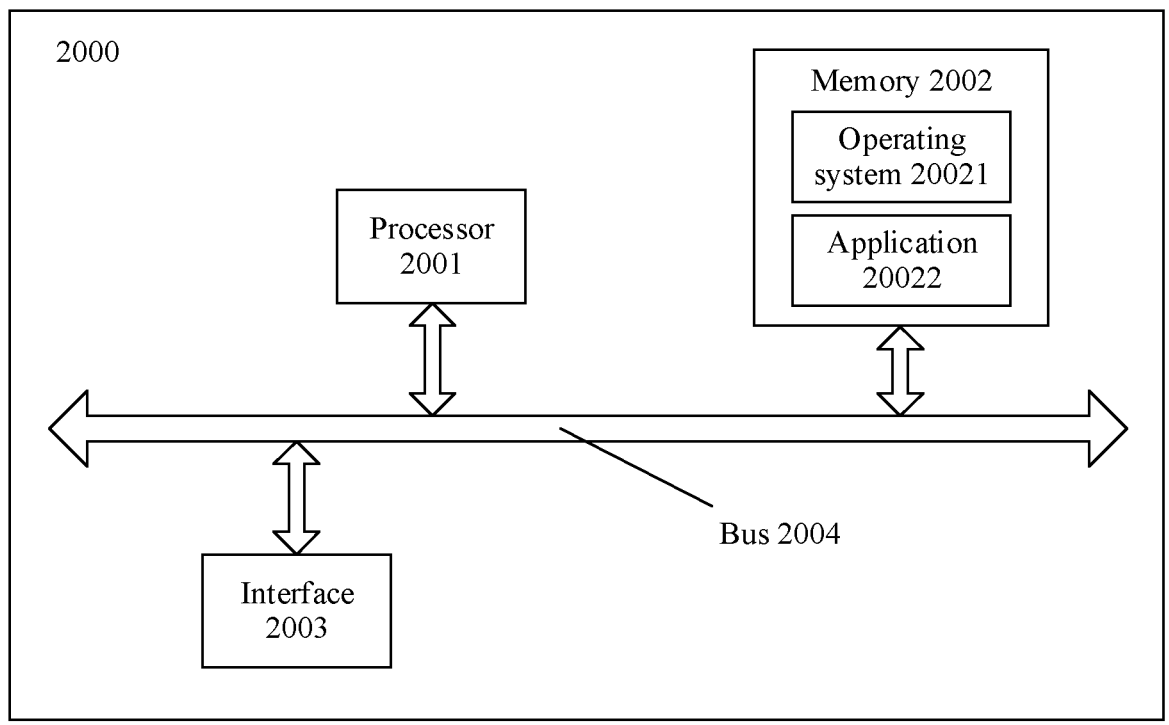
FIG. 8 is a schematic diagram of a hardware structure of a first network device according to an embodiment of this application.

FIG. 8 is a schematic diagram of a hardware structure of a first network device 2000 according to an embodiment of this application. The first network device 2000 shown in FIG. 8 may perform the corresponding steps performed by the first network device in the methods in the foregoing embodiments.

As shown in FIG. 8, the first network device 2000 includes a processor 2001, a memory 2002, an interface 2003, and a bus 2004. The interface 2003 may be implemented in a wireless or wired manner, and may be further a network adapter. The processor 2001, the memory 2002, and the interface 2003 are connected through the bus 2004.

The interface 2003 may further include a transmitter and a receiver, and is configured for the first network device to implement the foregoing receiving and sending. For example, the interface 2003 is configured to support receiving a first multicast packet sent by a multicast source device and forwarded by a first device group. For another example, the interface is configured to support sending the first multicast packet to a multicast destination device according to an RPF entry. For another example, the interface is configured to support sending the first multicast packet to the multicast destination device according to a second sub-entry.

The processor 2001 is configured to perform processing performed by the first network device in the foregoing embodiment. For example, the processor is configured to determine, according to an RPF entry, that the first multicast packet is a multicast packet forwarded by the first device group, generate the first sub-entry based on the second identifier, generate the second sub-entry based on the third identifier, and/or perform other processes for the techniques described herein.

For example, the processor 2001 is configured to support steps 410 to 495 in FIG. 4A and FIG. 4B. The memory 2002 includes an operating system 20021 and an application 20022, and is configured to store a program, code, or an instruction. When executing the program, the code, or the instruction, a processor or a hardware device may complete a processing process of the first network device in the method embodiment. Optionally, the memory 2002 may include a ROM and a RAM. The ROM includes a BIOS or an embedded system, and the RAM includes an application and an operating system. When the first network device 2000 needs to run, a bootloader in the BIOS or the embedded system that is built into the ROM is used to boot a system to start, and boot the first network device 2000 to enter a normal running state. After entering the normal running state, the first network device 2000 runs the application and the operating system in the RAM, to complete the processing processes of the first network device 2000 in the method embodiment.

It may be understood that FIG. 8 shows only a simplified design of the first network device 2000. In actual application, the first network device may include any quantity of interfaces, processors, or memories.

Figure 9:
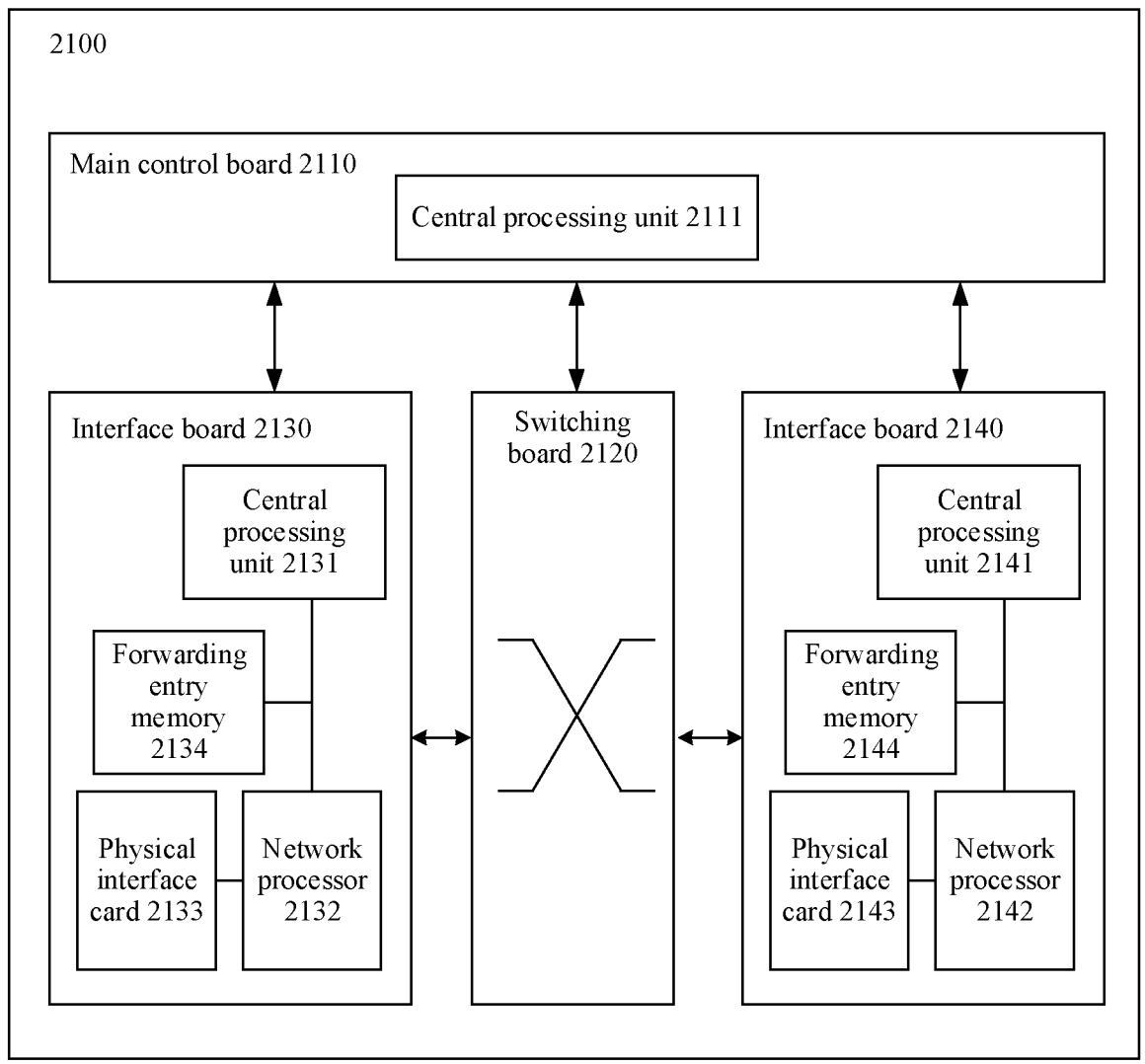
FIG. 9 is a schematic diagram of a hardware structure of another first network device according to an embodiment of this application.

FIG. 9 is a schematic diagram of a hardware structure of another first network device 2100 according to an embodiment of this application. The first network device 2100 shown in FIG. 9 may perform the corresponding steps performed by the first network device in the methods in the foregoing embodiments.

As shown in FIG. 9, the first network device 2100 includes a main control board 2110, an interface board 2130, a switching board 2120, and an interface board 2140. The main control board 2110, the interface boards 2130 and 2140, and the switching board 2120 are connected to a system backboard through a system bus for interworking. The main control board 2110 is configured to complete functions such as system management, device maintenance, and protocol processing. The switching board 2120 is configured to exchange data between interface boards (the interface board is also referred to as a line card or a service board). The interface boards 2130 and 2140 are configured to provide various service interfaces (for example, a point of sale (POS) interface, a Gigabit Ethernet (GE) interface, and an Asynchronous Transfer Mode (ATM) interface), and forward a data packet.

The interface board 2130 may include a central processing unit 2131, a forwarding entry memory 2134, a physical interface card 2133, and a network processor 2132. The central processing unit 2131 is configured to control and manage the interface board, and communicate with a central processing unit on the main control board. The forwarding entry memory 2134 is configured to store an RPF entry. The physical interface card 2133 is configured to receive and send traffic. The network processor 2132 is configured to control, based on the entry, the physical interface card 2133 to receive and send traffic.

Further, the physical interface card 2133 is configured to receive a first multicast packet sent by a multicast source device and forwarded by a first device group. After receiving the first multicast packet, the physical interface card 2133 sends the first multicast packet to a central processing unit 2111 by using the central processing unit 2131. The central processing unit 2111 processes the first multicast packet.

The central processing unit 2111 is further configured to determine, according to a RPF entry, that the first multicast packet is a multicast packet forwarded by the first device group, and/or perform other processes for the techniques described herein.

It should be understood that an operation on the interface board 2140 is consistent with an operation on the interface board 2130 in this embodiment of this application. For brevity, details are not described. It should be understood that the first network device 2100 in this embodiment may correspond to the functions and/or the various implemented steps in the method embodiment. Details are not described herein again.

In addition, it should be noted that there may be one or more main control boards, and when there is a plurality of main control boards, the main control boards may include an active main control board and a standby main control board. There may be one or more interface boards. The first network device having a stronger data processing capability provides more interface boards. There may also be one or more physical interface cards on the interface board. There may be no switching board or one or more switching boards. When there is a plurality of switching boards, load sharing and redundancy backup may be implemented together. In a centralized forwarding architecture, the first network device may not need the switching board, and the interface board provides a function of processing service data of an entire system. In a distributed forwarding architecture, the first network device may have at least one switching board, and data exchange between a plurality of interface boards is implemented by using the switching board, to provide a large-capacity data exchange and processing capability. Therefore, a data access and processing capability of the first network device in the distributed architecture is better than that of the device in the centralized architecture. A specific architecture that is to be used depends on a specific networking deployment scenario. This is not limited herein.

An embodiment of this application further provides a computer-readable medium configured to store a computer program. The computer program includes instructions used to perform the method in any possible implementation of any one of the foregoing aspects. The readable medium may be a ROM or a RAM. This is not limited in this embodiment of this application.

An embodiment of this application further provides a computer program product. The computer program product is applied to a first network device, and the computer program product includes a series of instructions. When the instructions are executed, operations of the first network device in the methods according to the foregoing aspects are performed.

An embodiment of this application further provides a computer program product. The computer program product is applied to a first device group, and the computer program product includes a series of instructions. When the instructions are executed, operations of the first device group in the methods according to the foregoing aspects are performed.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiment. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, the function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet forwarding method implemented by a first network device, wherein the packet forwarding method comprises:
receiving, from a multicast source device and through one network device in a device group, a multicast packet, wherein the device group comprises a second network device and a third network device;
determining, according to a reverse-path forwarding (RPF) entry, that the multicast packet was forwarded by the device group, wherein the RPF entry comprises a first sub-entry instructing the first network device to forward the multicast packet from the second network device and a second sub-entry instructing the first network device to forward the multicast packet from the third network device; and
sending, to a multicast destination device according to the RPF entry, the multicast packet.

2. The packet forwarding method of claim 1, further comprising:
identifying a first communication link that is in a normal state and that is from the multicast source device, to the second network device, and then to the first network device; and
further sending, to the multicast destination device, in response to identifying that the first communication link is in the normal state, and according to the first sub-entry, the multicast packet.

3. The packet forwarding method of claim 2, further comprising:
identifying a second communication link that is in the normal state and that is from the multicast source device, to the third network device, and then to the first network device, wherein a first metric of the first communication link is less than a second metric of the second communication link; and
further receiving, in response to identifying that each of the first communication link and the second communication link is in the normal state and the first metric is less than the second metric, the multicast packet forwarded through the first communication link.

4. The packet forwarding method of claim 1, further comprising:
identifying that a first communication link is in a fault state and a second communication link is in a normal state; and
further sending, in response to identifying that the first communication link is in the fault state and the second communication link is in the normal state, to the multicast destination device, and according to the second sub-entry, the multicast packet.

5. The packet forwarding method of claim 1, wherein before determining that the multicast packet is forwarded by the device group, the packet forwarding method further comprises:
receiving, from the second network device, first control information comprising a first identifier of the second network device;
generating, based on the first identifier, the first sub-entry comprising a first correspondence between the first identifier and a multicast source group (S, G) corresponding to the multicast packet;
receiving, from the third network device, second control information comprising a second identifier of the third network device; and
generating, based on the second identifier, the second sub-entry comprising a second correspondence between the second identifier and the multicast source group (S, G).

6. The packet forwarding method of claim 5, wherein the first identifier and the second identifier are Internet Protocol (IP) addresses or IP version 6 (IPv6) addresses.

7. The packet forwarding method of claim 5, wherein each of the first control information and the second control information further comprises a device group identifier, wherein the device group identifier identifies the device group, and wherein the packet forwarding method further comprises determining, based on the device group identifier, the RPF entry.

8. The packet forwarding method of claim 7, wherein the device group identifier is an Internet Protocol (IP) address, an IP version 6 (IPv6) address, or an integer.

9. A packet forwarding method comprising:
sending, by a second network device in a device group and to a first network device, a first identifier of the second network device and a device group identifier of the device group, wherein the device group further comprises a third network device; and sending, by the third network device to the first network device, a second identifier of the third network device and the device group identifier, wherein the first identifier, the second identifier, and the device group identifier are configured to trigger the first network device to generate a reverse-path forwarding (RPF) entry based on the first identifier, the second identifier, and the device group identifier, and wherein the RPF entry comprises a first sub-entry instructing the first network device to forward a multicast packet sent by the second network device and comprises a second sub-entry instructing the first network device to forward the multicast packet sent by the third network device.

10. The packet forwarding method of claim 9, further comprising:

receiving, by a fourth network device in the device group and from a multicast source device, the multicast packet; and forwarding, by the fourth network device and to the first network device, the multicast packet.

11. The packet forwarding method of claim 9, further comprising receiving, by a fourth network device in the device group and from a multicast source device, a unicast packet, wherein the multicast packet is encapsulated in the unicast packet.

12. The packet forwarding method of claim 11, wherein a destination address of the unicast packet is the device group identifier, and wherein the device group identifier is an Internet Protocol (IP) address or an IP version 6 (IPv6) address.

13. The packet forwarding method of claim 9, further comprising:

identifying a first communication link that is in a normal state and that is from a multicast source device, to the second network device, and then to the first network device;

receiving, by the second network device, from the multicast source device, and in response to identifying the first communication link, the multicast packet; and forwarding, by the second network device, to the first network device, and in response to identifying the first communication link, the multicast packet.

14. The packet forwarding method of claim 13, further comprising identifying a second communication link that is in the normal state and that is from the multicast source device, to the third network device, and then to the first network device, wherein a first metric of the first communication link is less than a second metric of the second communication link.

15. The packet forwarding method of claim 9, further comprising:

identifying that a first communication link is in a fault state and a second communication link is in a normal state;

receiving, by the third network device, from a multicast source device, and in response to identifying that the first communication link is in the fault state and the second communication link is in the normal state, the multicast packet; and forwarding, by the third network device, to the first network device, and in response to identifying that the first communication link is in the fault state and the second communication link is in the normal state, the multicast packet.

16. The packet forwarding method of claim 9, wherein the first identifier and the second identifier are Internet Protocol (IP) addresses or IP version 6 (IPv6) addresses.

17. The packet forwarding method of claim 9, wherein the device group identifier is configured on the second network device and the third network device.

18. A first network device comprising:

a non-transitory memory configured to store instructions; and a processor coupled to the non-transitory memory, wherein the instructions, when executed by the processor, cause the first network device to:

receive, from a multicast source device and forwarded by one network device in a first device group, a multicast packet, wherein the device group comprises a second network device and a third network device;

determine, according to a reverse-path forwarding (RPF) entry, that the multicast packet is forwarded by the first device group, wherein the RPF entry comprises a first sub-entry instructing the first network device to forward the multicast packet sent by the second network device and a second sub-entry instructing the first network device to forward the multicast packet sent by the third network device; and send, to a multicast destination device and according to the RPF entry, the multicast packet.

19. The first network device of claim 18, wherein the instructions, when executed by the processor, further cause the first network device to:

identify a first communication link that is in a normal state and that is from the multicast source device to the second network device and the first network device; and further send, in response to identifying the first communication link, to the multicast destination device, and according to the first sub-entry, the multicast packet.

20. The first network device of claim 19, wherein the instructions, when executed by the processor, further cause the first network device to:

identify a second communication link that is in the normal state and that is from the multicast source device to the third network device and the first network device, wherein a first metric of the first communication link is less than a second metric of the second communication link; and further receive, in response to identifying that each of the first communication link and the second communication link is in the normal state and the first metric is less than the second metric, the multicast packet forwarded through the first communication link.

21. The first network device of claim 18, wherein the instructions, when executed by the processor, further cause the first network device to:

identify that a first communication link is in a fault state and a second communication link is in a normal state; and further send, in response to identifying that the first communication link is in the fault state and the second communication link is in the normal state, to the multicast destination device, and according to the second sub-entry, the multicast packet.

22. The first network device of claim 18, wherein the instructions, when executed by the processor, further cause the first network device to:

receive, from the second network device, first control information comprising a first identifier of the second network device;

generate, based on the first identifier, the first sub-entry comprising a first correspondence between the first identifier and a multicast source group (S, G) corresponding to the multicast packet;

receive, from the third network device, second control information comprising a second identifier of the third network device; and generate, based on the second identifier, the second sub-entry comprising a second correspondence between the second identifier and the multicast source group (S, G).

23. The first network device of claim 22, wherein the first identifier and the second identifier are Internet Protocol (IP) addresses or IP version 6 (IPv6) addresses.

24. The first network device of claim 22, wherein each of the first control information and the second control information further comprises a device group identifier of the device group, and wherein the instructions, when executed by the processor, further cause the first network device to determine, based on the device group identifier, the RPF entry.

25. The first network device of claim 24, wherein the device group identifier is an Internet Protocol (IP) address, an IP version 6 (IPv6) address, or an integer.

26. A device group comprising:
a second network device;
a third network device; and
a processor coupled to the second network device and the third network device and configured to:
send, using the second network device and to a first network device, a first identifier of the second network device and a device group identifier of the device group; and
send, using the third network device to the first network device, a second identifier of the third network device and the device group identifier, wherein the first identifier, the second identifier, and the device group identifier are configured to trigger the first network device to generate a reverse-path forwarding (RPF) entry based on the first identifier, the second identifier, and the device group identifier, and wherein the RPF entry comprises a first sub-entry instructing the first network device to forward a multicast packet sent by the second network device and a second sub-entry instructing the first network device to forward the multicast packet sent by the third network device.

27. The device group of claim 26, wherein the processor is further configured to:
receive, using a fourth network device in the device group and from a multicast source device, the multicast packet; and
forward, using the fourth network device and to the first network device, the multicast packet.

28. The device group of claim 26, wherein the processor is further configured to receive, using a fourth network device in the device group and from a multicast source device, a unicast packet, and wherein the multicast packet is encapsulated in the unicast packet.

29. The device group of claim 28, wherein a destination address of the unicast packet is the device group identifier, and wherein the device group identifier is an Internet Protocol (IP) address or an IP version 6 (IPv6) address.

30. The device group of claim 26, wherein the processor is further configured to:
identify a communication link that is in a normal state and that is from a multicast source device to the second network device and the first network device;
receive, from the multicast source device and in response to identifying the communication link, the multicast packet; and
forward, using the second network device, to the first network device, and in response to identifying the communication link, the multicast packet.

* * * * *